United States Patent
Nagayoshi et al.

(10) Patent No.: US 7,564,492 B2
(45) Date of Patent: Jul. 21, 2009

(54) SOLID-STATE IMAGE SENSING DEVICE AND CAMERA USING THE SAME

(75) Inventors: Ryoichi Nagayoshi, Nishinomiya (JP); Toshiya Fujii, Otsu (JP); Tsuyoshi Hasuka, Sakai (JP); Akiyoshi Kohno, Kyoto (JP); Shinichi Tashiro, Ibaraki (JP); Keijiro Itakura, Ibaraki (JP)

(73) Assignee: Panasonic Corporation, Osaka (JP)

( * ) Notice: Subject to any disclaimer, the term of this patent is extended or adjusted under 35 U.S.C. 154(b) by 841 days.

(21) Appl. No.: 10/712,770

(22) Filed: Nov. 12, 2003

(65) Prior Publication Data

US 2004/0150733 A1 Aug. 5, 2004

(30) Foreign Application Priority Data

Nov. 12, 2002 (JP) ............................. 2002-328868
Nov. 6, 2003 (JP) ............................. 2003-377163

(51) Int. Cl.
*H04N 3/14* (2006.01)
*H04N 5/335* (2006.01)

(52) U.S. Cl. ..................................... 348/273; 348/322

(58) Field of Classification Search ................. 348/266, 348/272, 273, 322
See application file for complete search history.

(56) References Cited

U.S. PATENT DOCUMENTS

| | | | |
|---|---|---|---|
| 4,996,600 A | | 2/1991 | Nishida et al. |
| 5,436,661 A | * | 7/1995 | Yamamoto et al. .......... 348/264 |
| 6,423,959 B1 | * | 7/2002 | Ikeda et al. .............. 250/208.1 |
| 6,686,960 B2 | * | 2/2004 | Iizuka ........................ 348/273 |
| 7,199,826 B2 | * | 4/2007 | Uya ........................... 348/273 |

FOREIGN PATENT DOCUMENTS

| | | |
|---|---|---|
| EP | 0 936 806 | 8/1999 |
| JP | 1-309579 | 12/1989 |
| JP | 6-284344 | 10/1994 |
| JP | 10-51692 | 2/1998 |
| JP | 11-234688 | 8/1999 |
| JP | 2002-57943 | 2/2002 |
| JP | 2002-77931 | 3/2002 |

* cited by examiner

*Primary Examiner*—David L Ometz
*Assistant Examiner*—Dillon Durnford-Geszvain
(74) *Attorney, Agent, or Firm*—Hamre, Schumann, Mueller & Larson, P.C.

(57) ABSTRACT

The present invention provides a solid-state image sensing device that can reduce at least the number of pixels arranged in the horizontal direction and can output high quality picture signals at high speed without generating moire or alias. The solid-state image sensing device includes vertical transfer parts 3 in which signal charges read out from photoelectric conversion parts 2 arranged bidimensionally are transferred in the vertical direction stage by stage, a horizontal transfer part 4 in which signal charges received from the vertical transfer parts 3 are transferred in the horizontal direction, and a control unit that controls transfer operations of the vertical transfer parts 3 and horizontal transfer part 4, wherein vertical last stages of the vertical transfer parts 3 have transfer electrodes formed to have identical configurations repeated every 2n+1 (n denotes an integer of 1 or higher) columns, and vertical last stages of columns other than one column among the 2n+1 columns or all vertical stages are provided with transfer electrodes that are independent of those of the other vertical last stages.

8 Claims, 35 Drawing Sheets

|  | Col.1 | Col.2 | Col.3 | Col.1 | Col.2 | Col.3 | Col.1 | Col.2 | Col.3 | Col.1 | Col.2 | Col.3 | Col.1 | Col.2 |
|---|---|---|---|---|---|---|---|---|---|---|---|---|---|---|
|  | G51 | B53 | G52 | B51 | G53 | B52 | G51 | B53 | G52 | B51 | G53 | B52 | G51 | B53 |
|  | R41 | G43 | R42 | G41 | R43 | G42 | R41 | G43 | R42 | G41 | R43 | G42 | R41 | G43 |
| Vertical last stage | G31 | B33 | G32 | B31 | G33 | B32 | G31 | B33 | G32 | B31 | G33 | B32 | G31 | B33 |

|  | Col.1 | Col.2 | Col.3 | Col.1 | Col.2 | Col.3 | Col.1 | Col.2 | Col.3 | Col.1 | Col.2 | Col.3 | Col.1 | Col.2 |
|---|---|---|---|---|---|---|---|---|---|---|---|---|---|---|
|  | R21+R22+R23 |  | G11+G12+G13 | G21+G22+G23 |  | B11+B12+B13 | R21+R22+R23 |  | G11+G12+G13 | G21+G22+G23 |  | B11+B12+B13 | R21+R22+R23 |  |

FIG. 9

|  | Col.1 | Col.2 | Col.3 | Col.1 | Col.2 | Col.3 | Col.1 | Col.2 | Col.3 | Col.1 | Col.2 | Col.3 | Col.1 | Col.2 |
|---|---|---|---|---|---|---|---|---|---|---|---|---|---|---|
|  | R61 | G63 | R62 | G61 | R63 | G62 | R61 | G63 | R62 | G61 | R63 | G62 | R61 | G63 |
|  | G51 | B53 | G52 | B51 | G53 | B52 | G51 | B53 | G52 | B51 | G53 | B52 | G51 | B53 |
| Vertical last stage | R41 | G43 | R42 | G41 | R43 | G42 | R41 | G43 | R42 | G41 | R43 | G42 | R41 | G43 |

|  | Col.1 | Col.2 | Col.3 | Col.1 | Col.2 | Col.3 | Col.1 | Col.2 | Col.3 | Col.1 | Col.2 | Col.3 | Col.1 | Col.2 |
|---|---|---|---|---|---|---|---|---|---|---|---|---|---|---|
|  | G31+G32+G33 | B11+B12+B13 | R21+R22+R23 | B31+B32+B33 | G11+G12+G13 | G21+G22+G23 | G31+G32+G33 | B11+B12+B13 | R21+R22+R23 | B31+B32+B33 | G11+G12+G13 | G21+G22+G23 | G31+G32+G33 | B11+B12+B13 |

FIG. 10

| Col.1 | Col.2 | Col.3 | Col.1 | Col.2 | Col.3 | Col.1 | Col.2 | Col.3 | Col.1 | Col.2 | Col.3 | Col.1 | Col.2 |
|---|---|---|---|---|---|---|---|---|---|---|---|---|---|
| R61 | G63 | R62 | G61 | R63 | G62 | R61 | G63 | R62 | G61 | R63 | G62 | R61 | G63 |
| G51 | B53 | G52 | B51 | G53 | B52 | G51 | B53 | G52 | B51 | G53 | B52 | G51 | B53 |
| R41 | G43 | R42 | G41 | R43 | G42 | R41 | G43 | R42 | G41 | R43 | G42 | R41 | G43 |

Vertical last stage ←

| G31 + G32 + G33 | B11 + B12 + B13 | R21 + R22 + R23 | B31 + B32 + B33 | G11 + G12 + G13 | G21 + G22 + G23 | G31 + G32 + G33 | B11 + B12 + B13 | R21 + R22 + R23 | B31 + B32 + B33 | G11 + G12 + G13 | G21 + G22 + G23 | G31 + G32 + G33 | B11 + B12 + B13 |
|---|---|---|---|---|---|---|---|---|---|---|---|---|---|
| a6 | a1 | a2 | a3 | a4 | a5 | a6 | a1 | a2 | a3 | a4 | a5 | a6 | a1 |

FIG. 11

| Col.1 | Col.2 | Col.3 | Col.1 | Col.2 | Col.3 | Col.1 | Col.2 | Col.3 | Col.1 | Col.2 | Col.3 | Col.1 | Col.2 |
|---|---|---|---|---|---|---|---|---|---|---|---|---|---|
| G31 | B33 | G32 | B31 | G33 | B32 | G31 | B33 | G32 | B31 | G33 | B32 | G31 | B33 |
| R21 | G23 | R22 | G21 | R23 | G22 | R21 | G23 | R22 | G21 | R23 | G22 | R21 | G23 |
| G11 | B13 | G12 | B11 | G13 | B12 | G11 | B13 | G12 | B11 | G13 | B12 | G11 | B13 |

Vertical last stage

| R61 + R62 + R63 | G41 + G42 + G43 | G51 + G52 + G53 | G61 + G62 + G63 | R41 + R42 + R43 | B51 + B52 + B53 | R61 + R62 + R63 | G41 + G42 + G43 | G51 + G52 + G53 | G61 + G62 + G63 | R41 + R42 + R43 | B51 + B52 + B53 | R61 + R62 + R63 | G41 + G42 + G43 |
|---|---|---|---|---|---|---|---|---|---|---|---|---|---|

FIG. 12

|  | Col.1 | Col.2 | Col.3 | Col.1 | Col.2 | Col.3 | Col.1 | Col.2 | Col.3 | Col.1 | Col.2 | Col.3 | Col.1 | Col.2 |
|---|---|---|---|---|---|---|---|---|---|---|---|---|---|---|
| | G31 | B33 | G32 | B31 | G33 | B32 | G31 | B33 | G32 | B31 | G33 | B32 | G31 | B33 |
| | R21 | G23 | R22 | G21 | R23 | G22 | R21 | G23 | R22 | G21 | R23 | G22 | R21 | G23 |
| Vertical last stage | G11 | B13 | G12 | B11 | G13 | B12 | G11 | B13 | G12 | B11 | G13 | B12 | G11 | B13 |

| R61 + R62 + R63 | G41 + G42 + G43 | G51 + G52 + G53 | G61 + G62 + G63 | R41 + R42 + R43 | B51 + B52 + B53 | R61 + R62 + R63 | G41 + G42 + G43 | G51 + G52 + G53 | G61 + G62 + G63 | R41 + R42 + R43 | B51 + B52 + B53 | R61 + R62 + R63 | G41 + G42 + G43 |
|---|---|---|---|---|---|---|---|---|---|---|---|---|---|
| b6 | b1 | b2 | b3 | b4 | b5 | b6 | b1 | b2 | b3 | b4 | b5 | b6 | b1 |

FIG. 13

Two dimensional re-arrangement of output signal
FIG. 14A
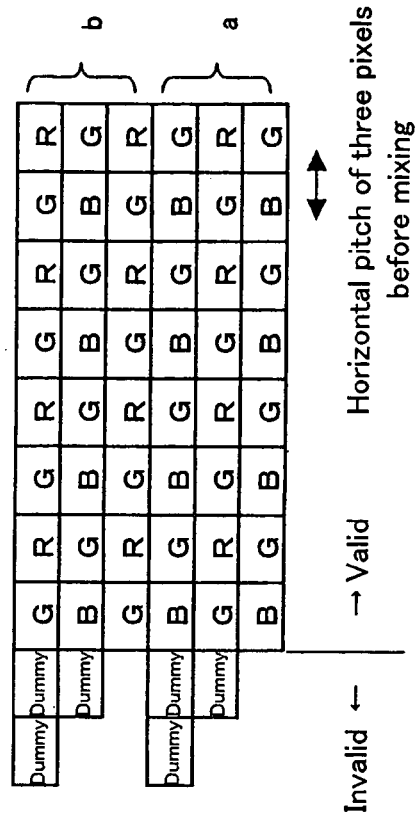
FIG. 14B
Two dimensional re-arrangement of mixed pixels at the center of the pixels
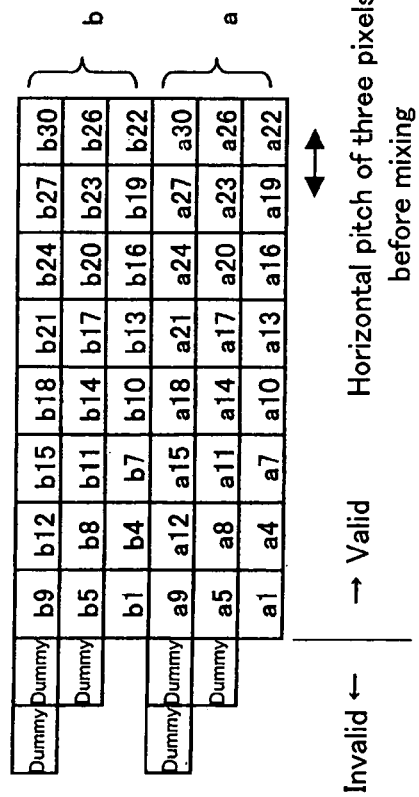
FIG. 14C
Color arrangement of mixed pixels

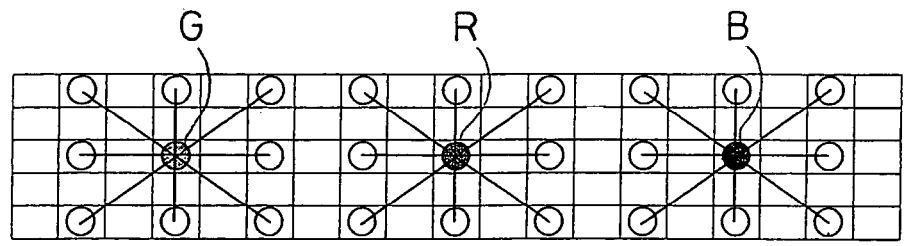
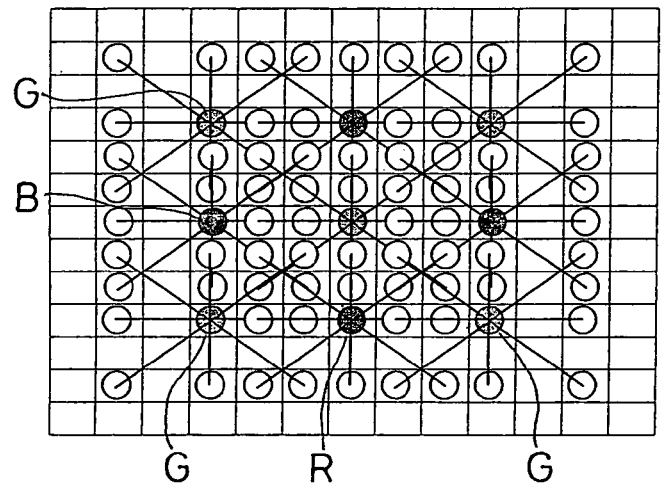
FIG. 15
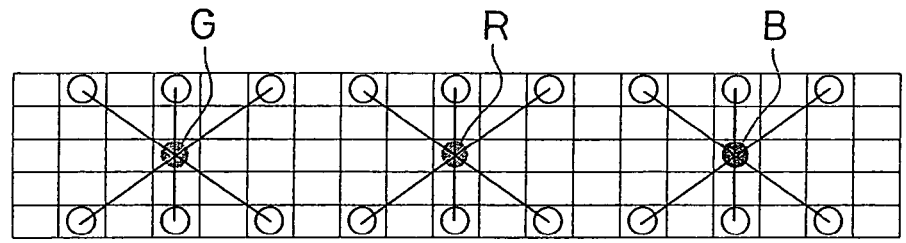
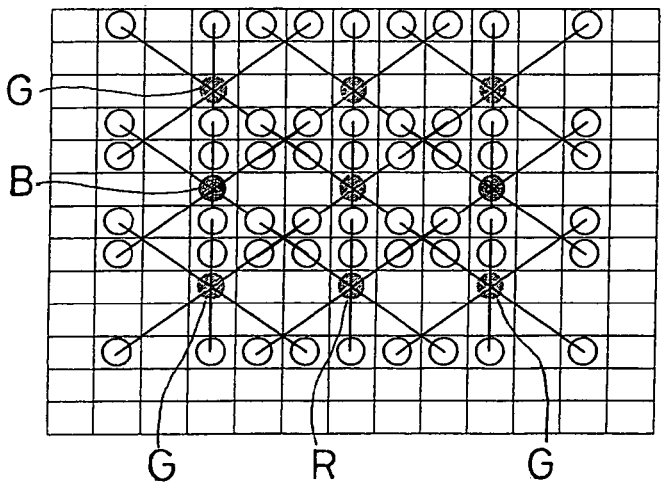
FIG. 16

FIG.30
| 81 | 82 | 83 | 84 | 85 | 86 | 87 | 88 |
| --- | --- | --- | --- | --- | --- | --- | --- |
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 | 33 | 34 | 35 | 36 | 37 | 38 |
| 21 | 22 | 23 | 24 | 25 | 26 | 27 | 28 |
| 11 | 12 | 13 | 14 | 15 | 16 | 17 | 18 |
V last stage
HCCD
FIG.31
| 81 | 82 | 83 | 84 | 85 | 86 | 87 | 88 |
| --- | --- | --- | --- | --- | --- | --- | --- |
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 | 33 | 34 | 35 | 36 | 37 | 38 |
| 21 | 22 | 23 | 24 | 25 | 26 | 27 | 28 |
| 11 | 12 |  | 14 | 15 |  | 17 | 18 |
V last stage
 
| | | 13 | | | 16 | | |
| --- | --- | --- | --- | --- | --- | --- | --- |
HCCD

FIG.32

| 81 | 82 | 83 | 84 | 85 | 86 | 87 | 88 |
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 | 33 | 34 | 35 | 36 | 37 | 38 |
| 21 | 22 | 23 | 24 | 25 | 26 | 27 | 28 |
| 11 | 12 |    | 14 | 15 |    | 17 | 18 |

V last stage

HCCD: 13 ⇐   16 ⇐   19

FIG.33

| 81 | 82 | 83 | 84 | 85 | 86 | 87 | 88 |
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 | 33 | 34 | 35 | 36 | 37 | 38 |
| 21 | 22 | 23 | 24 | 25 | 26 | 27 | 28 |
| 11 |    |    | 14 |    |    | 17 |    |

V last stage

HCCD:

|   | 12 |   |   | 15 |   |   | 18 |
|   | 13 |   |   | 16 |   |   | 19 |

FIG.34

| 81 | 82 | 83 | 84 | 85 | 86 | 87 | 88 |
|----|----|----|----|----|----|----|----|
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 | 33 | 34 | 35 | 36 | 37 | 38 |
| 21 | 22 | 23 | 24 | 25 | 26 | 27 | 28 |
| 11 |    |    | 14 |    |    | 17 |    |

V last stage

HCCD

|  | 12 13 |  |  | 15 16 |  |  | 18 19 |  |

FIG.35

| 81 | 82 | 83 | 84 | 85 | 86 | 87 | 88 |
|----|----|----|----|----|----|----|----|
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 | 33 | 34 | 35 | 36 | 37 | 38 |
| 21 | 22 | 23 | 24 | 25 | 26 | 27 | 28 |

V last stage

HCCD

|  | 11 12 13 |  |  | 14 15 16 |  |  | 17 18 19 |  |

FIG.36
| | | | | | | | |
|---|---|---|---|---|---|---|---|
| 81 | 82 | 83 | 84 | 85 | 86 | 87 | 88 |
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 | 33 | 34 | 35 | 36 | 37 | 38 |
| 21 | 22 | 23 | 24 | 25 | 26 | 27 | 28 |
V last stage
| 11 12 13 | | | 14 15 16 | | | 17 18 19 | |
HCCD
FIG.37
| | | | | | | | |
|---|---|---|---|---|---|---|---|
| 81 | 82 | 83 | 84 | 85 | 86 | 87 | 88 |
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 | 33 | 34 | 35 | 36 | 37 | 38 |
| 21 | 22 | | 24 | 25 | | 27 | 28 |
V last stage
 
| 11 12 13 | | 23 | 14 15 16 | | 26 | 17 18 19 | |
HCCD

FIG.38

| | | | | | | | |
|---|---|---|---|---|---|---|---|
| 81 | 82 | 83 | 84 | 85 | 86 | 87 | 88 |
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 | 33 | 34 | 35 | 36 | 37 | 38 |

V last stage

| | 22 | | 24 | 25 | | 27 | 28 |
|---|---|---|---|---|---|---|---|

HCCD

| | | 14 15 | | | 17 18 | | |
|---|---|---|---|---|---|---|---|
| | 23 | 16 ← | | 26 | 19 ← | | 29 |

FIG.39

| | | | | | | | |
|---|---|---|---|---|---|---|---|
| 81 | 82 | 83 | 84 | 85 | 86 | 87 | 88 |
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 | 33 | 34 | 35 | 36 | 37 | 38 |

V last stage

| 21 | | | 24 | | | 27 | |
|---|---|---|---|---|---|---|---|

HCCD

| | | 14 | | | 17 | | |
|---|---|---|---|---|---|---|---|
| | 22 | 15 | | 25 | 18 | | 28 |
| | 23 | 16 | | 26 | 19 | | 29 |

FIG.40

|    |    |    |    |    |    |    |    |
|----|----|----|----|----|----|----|----|
|    | 81 | 82 | 83 | 84 | 85 | 86 | 87 | 88 |
|    | 71 | 72 | 73 | 74 | 75 | 76 | 77 | 78 |
|    | 61 | 62 | 63 | 64 | 65 | 66 | 67 | 68 |
|    | 51 | 52 | 53 | 54 | 55 | 56 | 57 | 58 |
|    | 41 | 42 | 43 | 44 | 45 | 46 | 47 | 48 |
|    | 31 | 32 | 33 | 34 | 35 | 36 | 37 | 38 |
| V last stage | 21 |  |  | 24 |  |  | 27 |  |

| | | | | | | | |
|---|---|---|---|---|---|---|---|
| | | 14 | | | 17 | | | |
| 22 | 15 | | 25 | 18 | ⇐ | 28 | |
| HCCD | 23 | 16 | ⇐ | 26 | 19 | | 29 | |

FIG.41

|    |    |    |    |    |    |    |    |
|----|----|----|----|----|----|----|----|
| 81 | 82 | 83 | 84 | 85 | 86 | 87 | 88 |
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 | 33 | 34 | 35 | 36 | 37 | 38 |

V last stage
⇓                    ⇓                    ⇓

| | | | | | | | |
|---|---|---|---|---|---|---|---|
| 21 | 14 | | 24 | 17 | | 27 | |
| 22 | 15 | | 25 | 18 | | 28 | |
| HCCD | 23 | 16 | | 26 | 19 | | 29 | |

|   |   |   |   |   |   |   |   |
|---|---|---|---|---|---|---|---|
|   |   |   |   |   |   |   |   |
| 81 | 82 | 83 | 84 | 85 | 86 | 87 | 88 |
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 | 33 | 34 | 35 | 36 | 37 | 38 |

V last stage

| 21 | 14 |   | 24 | 17 |   | 27 | 110 |
| 22 | 15 |   | 25 | 18 |   | 28 | 111 |
| 23 | 16 |   | 26 | 19 |   | 29 | 112 |

HCCD

|   |   |   |   |   |   |   |   |
|---|---|---|---|---|---|---|---|
|   |   |   |   |   |   |   |   |
| 81 | 82 | 83 | 84 | 85 | 86 | 87 | 88 |
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 |   | 34 | 35 |   | 37 | 38 |

V last stage

| 21 | 14 |    | 24 | 17 |    | 27 | 110 |
| 22 | 15 |    | 25 | 18 |    | 28 | 111 |
| 23 | 16 | 33 | 26 | 19 | 36 | 29 | 112 |

HCCD

FIG.44

| | | | | | | | |
|---|---|---|---|---|---|---|---|
| | | | | | | | |
| 81 | 82 | 83 | 84 | 85 | 86 | 87 | 88 |
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 | | 34 | 35 | | 37 | 38 |

V last stage

| 14 15 16 | 33 | 24 25 26 | 17 18 19 | 36 | 27 28 29 | 110 111 112 | 39 |
|---|---|---|---|---|---|---|---|

HCCD

FIG.45

| | | | | | | | |
|---|---|---|---|---|---|---|---|
| | | | | | | | |
| 81 | 82 | 83 | 84 | 85 | 86 | 87 | 88 |
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | | | 34 | | | 37 | |

V last stage

| 14 15 16 | 32 33 | 24 25 26 | 17 18 19 | 35 36 | 27 28 29 | 110 111 112 | 38 39 |
|---|---|---|---|---|---|---|---|

HCCD

FIG.48

| G81 | R82 | G83 | R84 | G85 | R86 | G87 | R88 |
| --- | --- | --- | --- | --- | --- | --- | --- |
| B71 | G72 | B73 | G74 | B75 | G76 | B77 | G78 |
| G61 | R62 | G63 | R64 | G65 | R66 | G67 | R68 |
| B51 | G52 | B53 | G54 | B55 | G56 | B57 | G58 |
| G41 | R42 | G43 | R44 | G45 | R46 | G47 | R48 |
| B31 | G32 | B33 | G34 | B35 | G36 | B37 | G38 |
| G21 | R22 | G23 | R24 | G25 | R26 | G27 | R28 |
| B11 | G12 | B13 | G14 | B15 | G16 | B17 | G18 |

FIG.49

| 81 | 82 | 83 | 84 | 85 | 86 | 87 | 88 |
| --- | --- | --- | --- | --- | --- | --- | --- |
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 | 33 | 34 | 35 | 36 | 37 | 38 |
| 21 | 22 | 23 | 24 | 25 | 26 | 27 | 28 |
| 11 | 12 | 13 | 14 | 15 | 16 | 17 | 18 |

V last stage

HCCD

FIG.50

| 81 | 82 | 83 | 84 | 85 | 86 | 87 | 88 |
|----|----|----|----|----|----|----|----|
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 | 33 | 34 | 35 | 36 | 37 | 38 |
| 21 | 22 | 23 | 24 | 25 | 26 | 27 | 28 |

V last stage

| 11 |  | 13 |  | 15 |  | 17 |  |
|----|----|----|----|----|----|----|----|

HCCD

|  | 12 |  | 14 |  | 16 |  | 18 |
|----|----|----|----|----|----|----|----|

FIG.51

| 81 | 82 | 83 | 84 | 85 | 86 | 87 | 88 |
|----|----|----|----|----|----|----|----|
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 | 33 | 34 | 35 | 36 | 37 | 38 |
| 21 | 22 | 23 | 24 | 25 | 26 | 27 | 28 |

V last stage

| 11 |  | 13 |  | 15 |  | 17 |  |
|----|----|----|----|----|----|----|----|

HCCD

| 12 |  | 14 |  | 16 |  | 18 |  |
|----|----|----|----|----|----|----|----|

FIG.52

| 81 | 82 | 83 | 84 | 85 | 86 | 87 | 88 |
|----|----|----|----|----|----|----|----|
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 | 33 | 34 | 35 | 36 | 37 | 38 |
| 21 | 22 | 23 | 24 | 25 | 26 | 27 | 28 |

V last stage

⇓   ⇓   ⇓   ⇓

HCCD: 11, 12 | | 13, 14 | | 15, 16 | | 17, 18 | |

FIG.53

| 81 | 82 | 83 | 84 | 85 | 86 | 87 | 88 |
|----|----|----|----|----|----|----|----|
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 | 33 | 34 | 35 | 36 | 37 | 38 |
| 21 | 22 | 23 | 24 | 25 | 26 | 27 | 28 |

V last stage

HCCD: 11, 12 | | 13, 14 | | 15, 16 | | 17, 18 | |

FIG.54

| | | | | | | | |
|---|---|---|---|---|---|---|---|
| 81 | 82 | 83 | 84 | 85 | 86 | 87 | 88 |
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 | 33 | 34 | 35 | 36 | 37 | 38 |
| 21 | 22 | 23 | 24 | 25 | 26 | 27 | 28 |

V last stage

HCCD

| | 13 14 | | 15 16 | | 17 18 | | 19 110 |
|---|---|---|---|---|---|---|---|

FIG.55

| | | | | | | | |
|---|---|---|---|---|---|---|---|
| 81 | 82 | 83 | 84 | 85 | 86 | 87 | 88 |
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 | 33 | 34 | 35 | 36 | 37 | 38 |
| | 22 | | 24 | | 26 | | 28 |

V last stage

HCCD

| 21 | 13 14 | 23 | 15 16 | 24 | 17 18 | 27 | 19 110 |
|---|---|---|---|---|---|---|---|

FIG.56

|    |    |    |    |    |    |    |    |
|----|----|----|----|----|----|----|----|
| 81 | 82 | 83 | 84 | 85 | 86 | 87 | 88 |
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 | 33 | 34 | 35 | 36 | 37 | 38 |

V last stage

|   | 22 |   | 24 |   | 26 |   | 28 |

HCCD

| 13 |    | 15 |    | 17 |    | 19 |    |
|----|----|----|----|----|----|----|----|
| 14 | 23 | 16 | 24 | 18 | 27 | 110| 29 |

FIG.57

|    |    |    |    |    |    |    |    |
|----|----|----|----|----|----|----|----|
| 81 | 82 | 83 | 84 | 85 | 86 | 87 | 88 |
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 | 33 | 34 | 35 | 36 | 37 | 38 |

V last stage

HCCD

| 13 | 22 | 15 | 24 | 17 | 26 | 19 | 28 |
|----|----|----|----|----|----|----|----|
| 14 | 23 | 16 | 25 | 18 | 27 | 110| 29 |

FIG.58

| 81 | 82 | 83 | 84 | 85 | 86 | 87 | 88 |
|----|----|----|----|----|----|----|----|
| 71 | 72 | 73 | 74 | 75 | 76 | 77 | 78 |
| 61 | 62 | 63 | 64 | 65 | 66 | 67 | 68 |
| 51 | 52 | 53 | 54 | 55 | 56 | 57 | 58 |
| 41 | 42 | 43 | 44 | 45 | 46 | 47 | 48 |
| 31 | 32 | 33 | 34 | 35 | 36 | 37 | 38 |
| 21 | 22 | 23 | 24 | 25 | 26 | 27 | 28 |
| 11 | 12 | 13 | 14 | 15 | 16 | 17 | 18 |

SOLID-STATE IMAGE SENSING DEVICE AND CAMERA USING THE SAME

TECHNICAL FIELD

The present invention relates generally to a solid-state image sensing device that converts light received thereby into electric signals and then outputs them as picture signals.

BACKGROUND ART

Conventionally, there have been known a solid-state image sensing device that converts light received thereby into electric signals and then outputs them as picture signals, and a camera such as a digital still camera that displays picture signals obtained from the solid-state image sensing device, as still pictures. Recently, in cameras with such a solid-state image sensing device, it has been required to improve image quality and functions, and the density of pixels has been increasing more and more.

In order to increase the speed at which picture signals are outputted in such a solid-state image sensing device, a driving method has been proposed in which pixels from which signal charges are to be read out are reduced in number. The number of pixels included in the output picture signals thereby is reduced. For example, JP11(1999)-234688A discloses a driving method in which, for instance, with three pixels arranged in the horizontal direction forming one block, signal charges of two pixels (two pixels arranged on right and left sides) other than the pixel located in the middle in each block are mixed together in a solid-state image sensing device while a signal charge of the pixel located in the middle in each block is mixed with that of the pixel located in the middle in the block adjacent thereto. Thereby the number of pixels arranged in the horizontal direction that are included in picture signals to be outputted from the solid-state image sensing device is reduced.

However, in reducing the number of the pixels arranged in the horizontal direction to one-third, a component corresponding to one third of the sampling frequency used when all the pixels output signal charges is added to the DC component of signals as aliasing errors. In the solid-state image sensing device employing the above-mentioned conventional driving method, the component corresponding to one third of the sampling frequency is not zero (see FIG. 27). This causes moire or aliases to be generated and thereby deteriorates the quality of images formed with the output picture signals, which has been a problem.

DISCLOSURE OF THE INVENTION

In order to solve such a problem, the present invention is intended to provide a solid-state image sensing device that allows at least the number of pixels arranged in the horizontal direction to decrease and can output high-quality picture signals at high speed without generating moire or aliases.

In order to achieve the above-mentioned object, a solid-state image sensing device according to the present invention includes vertical transfer parts provided corresponding to respective columns of bidimensionally arranged pixels to vertically transfer signal charges read out from the pixels, and a horizontal transfer part for horizontally transferring the signal charges received from the vertical transfer parts. Transfer stages located closest to the horizontal transfer part in the vertical transfer parts are vertical last stages. The vertical last stages have transfer electrodes formed to have identical configurations repeated every m (m denotes an integer of 2 or higher) columns. Vertical last stages of columns other than one of the m columns or all the vertical last stages of the m columns each are provided with a transfer electrode that is independent of those of other vertical last stages of the m columns so that an operation of transferring signal charges from the vertical last stages concerned to the horizontal transfer part is controlled independently of said other vertical last stages.

This allows at least the number of pixels arranged in the horizontal direction to decrease and thereby a solid-state image sensing device can be provided that can output high-quality picture signals at high speed without generating moire or aliases.

BRIEF DESCRIPTION OF DRAWINGS

FIG. 9 is an explanatory diagram showing a step of the pixel mixing operation performed by the solid-state image sensing device according to an embodiment of the present invention.

FIG. 10 is an explanatory diagram showing a step of the pixel mixing operation performed by the solid-state image sensing device according to an embodiment of the present invention.

FIG. 11 is an explanatory diagram showing a step of the pixel mixing operation performed by the solid-state image sensing device according to an embodiment of the present invention.

FIG. 12 is an explanatory diagram showing a step of the pixel mixing operation performed by the solid-state image sensing device according to an embodiment of the present invention.

FIG. 13 is an explanatory diagram showing a step of the pixel mixing operation performed by the solid-state image sensing device according to an embodiment of the present invention.

FIGS. 14A to 14C each are an explanatory diagram showing a step of the pixel mixing operation performed by the solid-state image sensing device according to an embodiment of the present invention.

FIG. 15 is an explanatory diagram showing an example of combinations of pixels to be mixed together (pixel mixture groups) in a solid-state image sensing device according to an embodiment of the present invention.

FIG. 16 is an explanatory diagram showing an example of combinations of pixels to be mixed together (pixel mixture groups) in a solid-state image sensing device according to an embodiment of the present invention.

FIG. 30 is an explanatory diagram showing a step of a pixel mixing operation performed by a solid-state image sensing device according to an embodiment of the present invention.

FIG. 31 is an explanatory diagram showing a step of the pixel mixing operation performed by the solid-state image sensing device according to an embodiment of the present invention.

FIG. 32 is an explanatory diagram showing a step of the pixel mixing operation performed by the solid-state image sensing device according to an embodiment of the present invention.

FIG. 33 is an explanatory diagram showing a step of the pixel mixing operation performed by the solid-state image sensing device according to an embodiment of the present invention.

FIG. 34 is an explanatory diagram showing a step of the pixel mixing operation performed by the solid-state image sensing device according to an embodiment of the present invention.

FIG. 35 is an explanatory diagram showing a step of the pixel mixing operation performed by the solid-state image sensing device according to an embodiment of the present invention.

FIG. 36 is an explanatory diagram showing a step of the pixel mixing operation performed by the solid-state image sensing device according to an embodiment of the present invention.

FIG. 37 is an explanatory diagram showing a step of the pixel mixing operation performed by the solid-state image sensing device according to an embodiment of the present invention.

FIG. 38 is an explanatory diagram showing a step of the pixel mixing operation performed by the solid-state image sensing device according to an embodiment of the present invention.

FIG. 39 is an explanatory diagram showing a step of the pixel mixing operation performed by the solid-state image sensing device according to an embodiment of the present invention.

FIG. 40 is an explanatory diagram showing a step of the pixel mixing operation performed by the solid-state image sensing device according to an embodiment of the present invention.

FIG. 41 is an explanatory diagram showing a step of the pixel mixing operation performed by the solid-state image sensing device according to an embodiment of the present invention.

FIG. 44 is an explanatory diagram showing a step of the pixel mixing operation performed by the solid-state image sensing device according to an embodiment of the present invention.

FIG. 45 is an explanatory diagram showing a step of the pixel mixing operation performed by the solid-state image sensing device according to an embodiment of the present invention.

FIG. 48 is an explanatory diagram showing an example of color filters used in a solid-state image sensing device according to an embodiment of the present invention.

FIG. 49 is an explanatory diagram showing a step of a pixel mixing operation performed by a solid-state image sensing device according to an embodiment of the present invention.

FIG. 50 is an explanatory diagram showing a step of the pixel mixing operation performed by the solid-state image sensing device according to an embodiment of the present invention.

FIG. 51 is an explanatory diagram showing a step of the pixel mixing operation performed by the solid-state image sensing device according to an embodiment of the present invention.

FIG. 52 is an explanatory diagram showing a step of the pixel mixing operation performed by the solid-state image sensing device according to an embodiment of the present invention.

FIG. 53 is an explanatory diagram showing a step of the pixel mixing operation performed by the solid-state image sensing device according to an embodiment of the present invention.

FIG. 54 is an explanatory diagram showing a step of the pixel mixing operation performed by the solid-state image sensing device according to an embodiment of the present invention.

FIG. 55 is an explanatory diagram showing a step of the pixel mixing operation performed by the solid-state image sensing device according to an embodiment of the present invention.

FIG. 56 is an explanatory diagram showing a step of the pixel mixing operation performed by the solid-state image sensing device according to an embodiment of the present invention.

FIG. 57 is an explanatory diagram showing a step of the pixel mixing operation performed by the solid-state image sensing device according to an embodiment of the present invention.

FIG. 58 is an explanatory diagram showing positions of the centers of gravity of the pixels to be mixed through the repetition of the steps shown in FIGS. 49 to 57.

BEST MODE FOR CARRYING OUT THE INVENTION

Figure 1:
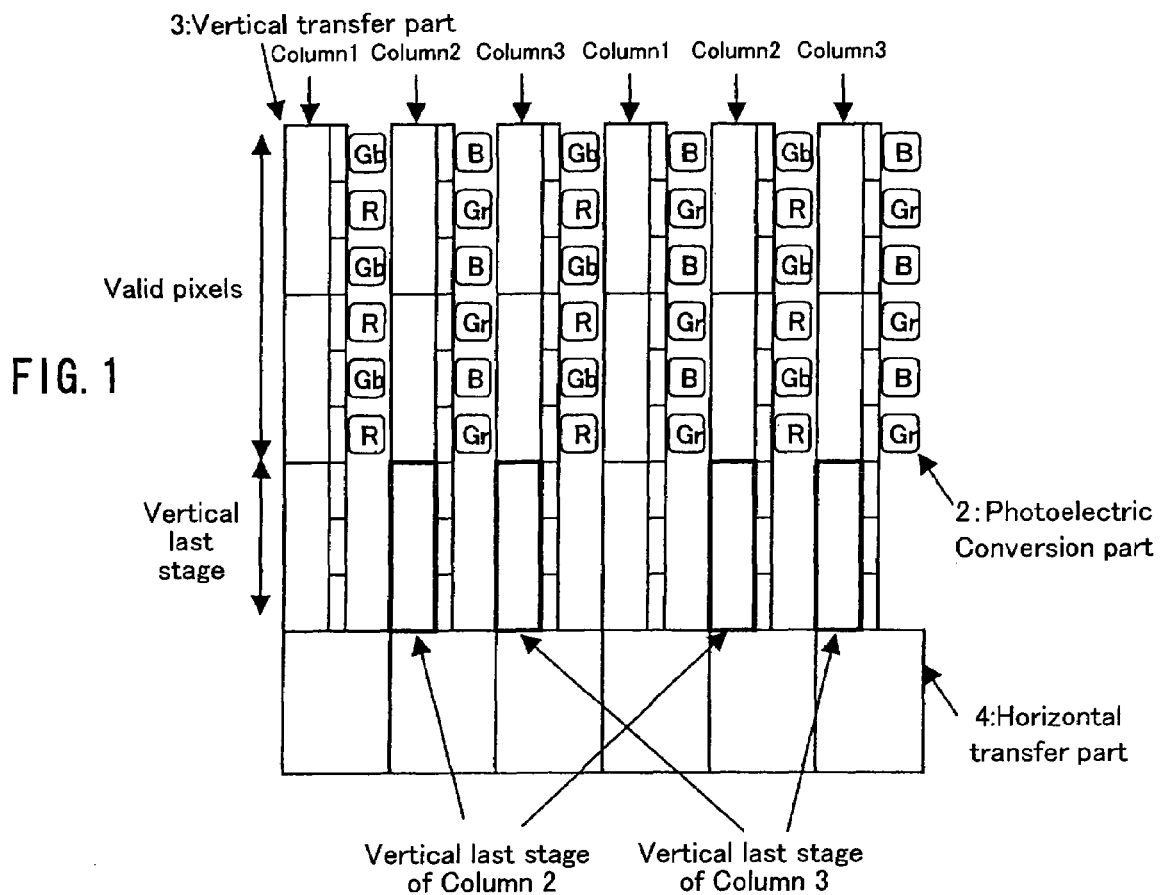
FIG. 1 is a plan view showing the configuration of a solid-state image sensing device according to an embodiment of the present invention.

The solid-state image sensing device of the present invention has a configuration that includes vertical transfer parts provided corresponding to respective columns of bidimensionally arranged pixels to vertically transfer signal charges read out from the pixels, and a horizontal transfer part for horizontally transferring the signal charges received from the vertical transfer parts, wherein the vertical transfer parts include transfer stages and those located closest to the horizontal transfer part are vertical last stages, and the vertical last stages have transfer electrodes formed to have identical configurations repeated every m (m denotes an integer of 2 or higher) columns, and vertical last stages of columns other than one of the m columns or all the vertical last stages of the m columns each are provided with a transfer electrode that is independent of those of other vertical last stages of the m columns so that an operation of transferring signal charges from the vertical last stages concerned to the horizontal transfer part is controlled independently of said other vertical last stages (Configuration 1).

The vertical transfer parts provided in the solid-state image sensing device of the present invention may be formed of: vertical CCDs including photoelectric conversion parts such as, for example, photodiodes provided corresponding to pixels arranged bidimensionally and a plurality of vertical transfer stages; or vertical CCDs that have a light-receiving function and include a plurality of vertical transfer stages.

According to Configuration 1 described above, signal charges of all the vertical last stages are transferred to the horizontal transfer part by transfer operations repeated m times. When the transfer from the vertical last stages to the horizontal transfer part is combined with the transfer in the horizontal direction carried out by the horizontal transfer part, it becomes possible to relocate or mix pixel outputs arbitrarily. The transfer operations of the vertical transfer parts and horizontal transfer part are controlled through application of predetermined control signals to transfer electrodes that are provided for them, respectively. A means (a control unit) for transmitting the control signals may be located outside the solid-state image sensing device or may be provided so as to form one body together with the solid-state image sensing device.

In the solid-state image sensing device according to the present invention, the above-mentioned integer m may be 2n+1 (n denotes an integer of 1 or higher) (Configuration 2). Furthermore, in this solid-state image sensing device, it is preferable that signal charges of pixels included in each of first and second pixel mixture groups are added together in the horizontal transfer part, wherein the first pixel mixture groups each are composed of 2n+1 (n denotes an integer of 1 or higher) pixels arranged every other pixel in the horizontal direction, and the second pixel mixture groups each are composed of 2n+1 pixels that are arranged at every other pixel and are pixels other than those of the first pixel mixture groups, with centers of gravity of the pixels of the respective second pixel mixture groups each being located at an equal distance from centers of gravity of the pixels of two first pixel mixture groups adjacent thereto (Configuration 3).

This configuration allows the number of pixels arranged in the horizontal direction to be reduced to 1/(2n+1) without wasting signal charges of the pixels. In addition, since the mixed pixels are spaced equally after the number of pixels is reduced, picture signals can be obtained that have high sensitivity, high resolution, and less moire.

In the solid-state image sensing device, it is further preferable that with respect to each of the first and second pixel mixture groups present in the vertical last stages, (a1) only signal charges of pixels located furthest from an output side of the horizontal transfer part in the respective pixel mixture groups each composed of the 2n+1 pixels are transferred from the vertical last stages to the horizontal transfer part, (a2) the signal charges present in the horizontal transfer part are transferred in the forward direction by a distance corresponding to two pixels, (a3) only signal charges of pixels that have signal charges remaining in the vertical last stages and are located furthest from the output side of the horizontal transfer part in the pixel groups each composed of the 2n+1 pixels are transferred from the vertical last stages to the horizontal transfer part, and (a4) the transfer operations a2 and a3 are repeated until all signal charges of the pixel groups each composed of 2n+1 pixels are transferred from the vertical last stages to the horizontal transfer part (Configuration 4).

With the operations described above, the 2n+1 pixels arranged every other pixel can be mixed together, and further 2n+1 pixels arranged at therebetween also can be mixed together.

In the solid-state image sensing device, it is preferable further that (b1) as the last operation of the transfer operations a1 to a4, signal charges present in the vertical transfer parts of all the columns are transferred to respective next stages after or at the same time the signal charge of the last pixel included in each of the pixel groups each composed of 2n+1 pixels is transferred from the vertical last stage to the horizontal transfer part, and (b2) with respect to signal charges transferred to the vertical last stages by the operation b1 described above, the transfer operations a1 to a4 are carried out, and (b3) the transfer operations b1 and b2 are repeated until signal charges included in 2n+1 stages are transferred to the horizontal transfer part (Configuration 5).

With the operations described above, since no vacant transfer section is present in the horizontal transfer part, the number of pixels arranged horizontally can be reduced to 1/(2n+1) without increasing the horizontal transfer speed.

In the aforementioned solid-state image sensing device, it is preferable that the vertical last stages located closest to the horizontal transfer part of the vertical transfer parts have transfer electrodes formed to have identical configurations repeated every three columns, and vertical last stages of at least the second and third columns of the three columns, counted as from the output side of the horizontal transfer part, each are provided with a transfer electrode that is independent of those of the other vertical last stages so that an operation of transferring signal charges from the respective vertical last stages concerned to the horizontal transfer part is controlled independently of the other vertical last stages (Configuration 6). This allows three pixels arranged in the horizontal direction to be mixed together and thereby the number of the pixels arranged horizontally can be reduced to one third.

In the solid-state image sensing device according to Configuration 6 described above, it is preferable that the vertical last stage of the first column counted as from the output side of the horizontal transfer part has an electrode configuration that is identical to those of stages other than the vertical last stage of the first column (Configuration 7).

In the solid-state image sensing device according to Configuration 6, it is preferable that first pixel mixture groups each are composed of three pixels arranged at every other pixel in the horizontal direction, and second pixel mixture groups each are composed of three pixels that are arranged at every other pixel and are pixels other than those of the first pixel mixture groups, with the centers of gravity of the pixels of the respective second pixel mixture groups each being located at an equal distance from centers of gravity of the pixels of two first pixel mixture groups adjacent thereto (Configuration 8). This configuration allows the number of pixels arranged in the horizontal direction to be reduced to one third without wasting signal charges of the pixels and permits the mixed pixels to be spaced equally after the number of pixels is reduced.

In the solid-state image sensing device according to Configuration 6, it is preferable that (c1) only a signal charge of the vertical last stage of the second column of the three columns described above, counted as from the output side of the horizontal transfer part, is transferred to the horizontal transfer part, (c2) signal charges present in the horizontal transfer part are transferred in the forward direction by a distance corresponding to two pixels, (c3) only a signal charge of the vertical last stage of the third column of the three columns described above, counted as from the output side of the horizontal transfer part, is transferred to the horizontal transfer part, (c4) signal charges present in the horizontal transfer part are transferred in the forward direction by the distance corresponding to two pixels, and (c5) a signal charge of the vertical last stage of the first column of the three columns described above, counted as from the output side of the horizontal transfer part, is transferred to the horizontal transfer part (Configuration 9). With the operations described above, the three pixels arranged at every other pixel can be mixed together, and the three pixels arranged therebetween also can be mixed together. In addition, the mixed pixels can be spaced equally after the number of pixels is reduced.

In the solid-state image sensing device according to Configuration 9, it is preferable that (d1) signal charges present in the vertical transfer parts of all the columns are transferred to respective next stages after or at the same time the signal charge of the vertical last stage of the first column is transferred to the horizontal transfer part by the transfer operation c5, (d2) with respect to the signal charges transferred to the vertical last stages in the end of the operation d1, the transfer operations c1 to c5 are carried out, and signal charges present in the vertical transfer parts of all the columns are transferred to respective next stages after or at the same time the signal charge of the vertical last stage of the first column is transferred to the horizontal transfer part by the operation c5, and (d3) the transfer operations c1 to c5 are carried out with respect to the signal charges transferred to the vertical last stages in the end of the operation d2 (Configuration 10). The operations described above allow the number of pixels arranged horizontally to be reduced to one third without increasing the horizontal transfer speed, because no vacant transfer stage is present in the horizontal transfer part even when three pixels arranged in the horizontal direction are mixed together.

In the solid-state image sensing device according to Configuration 3, it is preferable that one pixel mixture group is composed of (2n+1)×(2n+1) pixels that are those of either the first or the second pixel mixture groups each including 2n+1 pixels present in 2n+1 rows located at every other row in the vertical direction, and signal charges of the pixels arranged in the 2n+1 rows of each of the columns are added together in the respective vertical transfer parts (Configuration 11). According to this configuration, the number of data of one scene is 1/((2n+1)×(2n+1)), and thereby the number of frames per unit time can increase. In addition, since no pixels are wasted, the sensitivity improves.

In the solid-state image sensing device according to Configuration 11, it is preferable that the one pixel mixture group is composed of nine pixels arranged in three rows located at every other row in the vertical direction, with three pixels arranged at every other pixel in the horizontal direction being included in each of the three rows (Configuration 12). This makes it possible to increase the number of frames per unit time because the number of data of one scene is reduced to one ninth. In addition, since no pixels are wasted, the sensitivity improves.

In the solid-state image sensing device according to Configuration 3, it is preferable that one pixel mixture group is composed of six pixels arranged in two rows located with three rows being present therebetween in the vertical direction, with three pixels arranged at every other pixel in the horizontal direction being included in each of the two rows (Configuration 13). This provides an advantage that the linear signal range broadens as compared to the case of mixing pixels located in three rows arranged in the vertical direction.

In the solid-state image sensing device according to Configuration 3, it is preferable that one pixel mixture group is composed of three pixels arranged at every other pixel in the horizontal direction in each of rows located at every three rows in the vertical direction (Configuration 14). This provides an advantage that the linear signal range further broadens as compared to the case of mixing pixels located in three lines arranged in the vertical direction.

In the solid-state image sensing device according to Configuration 2, it is preferable that the bidimensionally arranged pixels are provided with color filters arranged so that four pixels of (two pixels arranged in the horizontal direction)× (two pixels arranged in the vertical direction) form one unit (Configuration 15). With this configuration, even after mixing of the pixels, a picture image can be obtained in the unchanged arrangement of the color filters arranged so that four pixels of (horizontally arranged two pixels)×(vertically arranged two pixels) form one unit.

In the solid-state image sensing device according to Configuration 15, it is preferable that the color filters are arranged so that a first color filter is provided for two pixels, of the four pixels, located on one diagonal line, and second and third color filters for the other two pixels, respectively (Configuration 16).

In the solid-state image sensing device according to Configuration 3, it is preferable that the bidimensionally arranged pixels are provided with color filters arranged so that eight pixels of (two pixels arranged in the horizontal direction)×(four pixels arranged in the vertical direction) form one unit, and two pixels adjoining each other in the vertical direction are mixed together in the vertical transfer parts (Configuration 17).

In the solid-state image sensing device according to the present invention, it is preferable that at least two independent electrodes are provided for each of the vertical last stages.

For instance, when the vertical last stage of each column is formed with six transfer electrodes, it is preferable that any one of the configurations described below is employed: (1) in all vertical transfer parts of three columns adjoining each other, among the six transfer electrodes, those located second and fourth from a side of the horizontal transfer part are independent electrodes that are independent of those of vertical last stages of the other columns, and those located first, third, fifth, and sixth are electrodes common to the other stages of the respective vertical transfer parts (Configuration 18); (2) in vertical transfer parts of two of three columns adjoining each other, among the six transfer electrodes, those located second and fourth from the horizontal transfer part side are independent electrodes that are independent of those of the vertical last stages of the other columns and those located first, third, fifth, and sixth are electrodes common to the other stages of the respective vertical transfer parts, and in a vertical transfer part of remaining one of the three columns adjoining each other, all the six transfer electrodes located first to sixth are electrodes common to the other stages of the vertical transfer part concerned (Configuration 19); (3) in all vertical transfer parts of three columns adjoining each other, among the six transfer electrodes, those located second, fourth, and sixth from the horizontal transfer part side are independent electrodes that are independent of those of the vertical last stages of the other columns, and those located first, third, and fifth are electrodes common to the other stages of the respective vertical transfer parts (Configuration 20); (4) in vertical transfer parts of two of three columns adjoining each other, among the six transfer electrodes, those located second, fourth, and sixth from the horizontal transfer part side are independent electrodes that are independent of those of the vertical last stages of the other columns and those located first, third, and fifth are electrodes common to the other stages of the respective vertical transfer parts, and in a vertical transfer part of a remaining one of the three columns adjoining each other, all the six transfer electrodes located first to sixth are electrodes common to the other stages of the vertical transfer part concerned (Configuration 21); (5) in vertical transfer parts of at least two of three adjoining columns, among the six transfer electrodes, those located second and fourth from the horizontal transfer part side are independent electrodes that are independent of those of the vertical last stages of the other columns, and in vertical transfer parts of all three columns adjoining each other, those located first and third from the horizontal transfer part side are different electrodes from those provided in the other stages of the respective vertical transfer parts (Configuration 22); and (6) in vertical transfer parts of at least two of three columns adjoining each other, among the six transfer electrodes, those located second, fourth, and sixth from the horizontal transfer part side are independent electrodes that are independent of those of the vertical last stages of the other columns, and in vertical transfer parts of all the three columns adjoining each other, those located first, third, and fifth from the horizontal transfer part side are different electrodes from those provided in the other stages of the respective vertical transfer parts (Configuration 23).

Furthermore, in the solid-state image sensing device according to Configuration 1 of the present invention, it also is preferable that: each stage of the vertical transfer parts is formed with six transfer electrodes; in the transfer stages other than the vertical last stage of each of the vertical transfer parts, the transfer electrodes located second, fourth, and sixth from the horizontal transfer part side each are formed of an electrode film of a first layer, as an electrode common to all the columns, and the transfer electrodes located first, third, and fifth from the horizontal transfer part side each are formed of an electrode film of a second layer that is an upper layer formed above the first layer, as an electrode common to all the columns; and in the respective vertical last stages, the electrodes located second and fourth from the horizontal transfer part side each are formed, as an independent electrode, of an electrode film identical to that of the second layer that is divided into insular parts located corresponding to the respective columns (Configuration 24). This configuration provides an advantage that the formation of the electrode film of the upper layer into the form of islands facilitates wiring.

Alternatively, in the solid-state image sensing device according to Configuration 1 of the present invention, it also is preferable that the vertical transfer parts have at least three layers of electrode films, and the transfer electrodes provided independently of those of vertical last stages of the other columns are formed of at least one of layers of electrode films that includes the top layer (Configuration 25). This provides an advantage that the formation of the independent transfer electrodes using the top layer makes it no longer necessary to wire later.

It also is preferable that the solid-state image sensing device according to Configuration 1 of the present invention has a configuration in which (e1) signal charges of pixels whose number is between 1 and (m−1) selected from m pixels arranged in the horizontal direction are transferred to the horizontal transfer part, (e2) the signal charges present in the horizontal transfer part are transferred in the forward or backward direction by at least a distance corresponding to one pixel, and (e3) the transfer operations e1 and e2 are repeated and thereby all signal charges of the m pixels are transferred to the horizontal transfer part (Configuration 26).

Moreover, it is further preferable that the solid-state image sensing device according to Configuration 26 described above has a configuration in which (e4) after the operation e3, signal charges of all the columns are transferred toward the horizontal transfer part by one stage, and (e5) signal charges transferred to the vertical last stages by the above-mentioned transfer operation e4 are subjected to the aforementioned transfer operations e1 to e3, and then the transfer operations e4 and e5 are repeated, thus transferring all the signal charges included in m stages to the horizontal transfer part (Configuration 27).

In the solid-state image sensing device according to Configuration 1, it is preferable that its operation mode can be switched selectively between at least two modes that include a mode of mixing m pixels arranged in the horizontal direction by driving transfer electrodes, which are provided independently of those of other columns in the vertical last stages of columns other than one of the m columns or all the columns, independently of the aforementioned other columns, and a mode of carrying out no pixel mixing by driving the transfer electrodes in the same manner as in the other columns (Configuration 28). This configuration is preferable because it allows the operation mode to be switched between a mode of outputting picture images having high resolution with no pixels being mixed and a mode of outputting picture images having high sensitivity and a high frame rate by mixing pixels.

It also is preferable that the solid-state image sensing device according to the present invention has a configuration in which the integer m indicates a common multiple of $m_1$ ($m_1$ denotes an integer of 2 or higher) and $m_2$ ($m_2$ denotes an integer of 2 or higher), and its operation mode can be switched selectively between at least two modes including a mode of mixing $m_1$ pixels arranged horizontally and a mode of mixing $m_2$ pixels arranged horizontally (Configuration 29).

Furthermore, in Configuration 29 described above, the solid-state image sensing device further may be provided with color filters of three colors arranged in a repeating pattern in which among the color filters, those of two out of the three colors are arranged in the vertical direction and those of two out of the three colors in the horizontal direction, wherein the operation mode may be switched selectively between at least two modes including a mode of mixing $m_1$ pixels arranged horizontally and a mode of mixing $m_2$ pixels arranged horizontally, with the $m_1$ pixels and $m_2$ pixels being provided with filters having one of the three colors of the color filters, respectively (Configuration 30).

Alternatively, in Configuration 29 described above, the solid-state image sensing device further may be provided with color filters of three colors arranged in a repeating pattern in which among the color filters, those of two out of the three colors are arranged in the vertical direction and those of two out of the three colors in the horizontal direction, wherein the operation mode may be switched selectively between at least two modes selected from a mode of mixing two pixels arranged horizontally, a mode of mixing three pixels arranged horizontally, and a mode of mixing four pixels arranged horizontally, with the two, three, and four pixels being provided with filters having one of the three colors of the color filters, respectively (Configuration 31).

Alternatively, in any one of Configurations 29 to 31 described above, a mode of mixing no pixels further may be included as the operation mode (Configuration 32). This configuration allows the operation mode to be switched between a mode of outputting picture images having high resolution without mixing pixels and a mode of outputting picture images having high sensitivity and a high frame rate by mixing pixels.

In Configuration 26 described above, the m pixels may be arranged consecutively in the horizontal direction (Configuration 33). Alternatively, the combination of the aforementioned m pixels arranged in the horizontal direction may be changed stage by stage (Configuration 34). When the combination of the pixels is changed stage by stage, it is preferable that in at least two stages adjoining each other, centers of gravity of combinations of the aforementioned m pixels are spaced equally in the horizontal direction (Configuration 35).

Moreover, a camera of the present invention includes any one of the aforementioned solid-state image sensing devices and preferably is a three-plate type color camera, particularly in the case of using a solid-state image sensing device in which pixels arranged consecutively in the horizontal direction are mixed together. Furthermore, in the case of the three-plate type color camera, it is preferable that when m=2, an operation mode can be switched selectively between at least two modes including a first mode of mixing no pixels and a second mode of mixing two pixels adjoining each other in the vertical direction and two pixels adjoining each other in the horizontal direction.

Hereafter, specific embodiments of the present invention are described with reference to the drawings.

First Embodiment

FIG. 1 shows a schematic configuration of a solid-state image sensing device according to the present embodiment. The solid-state image sensing device 1 of the present embodiment employs a system of reading out all pixels simultaneously and independently. The solid-state image sensing device 1 includes photoelectric conversion parts 2 disposed bidimensionally corresponding to pixels, vertical transfer parts 3, and a horizontal transfer part 4. The vertical transfer parts 3 and horizontal transfer part 4 each are formed of a CCD. Photodiodes are used as the photoelectric conversion parts 2. The respective photoelectric conversion parts 2 are provided with color filters of three colors, which are red (R), green (G), and blue (B). In the present embodiment, the R, G, and B filters each are disposed every two pixels periodically in both the vertical and horizontal directions. For instance, as shown in FIG. 1, when four pixels of (two pixels arranged vertically)×(two pixels arranged horizontally) form one unit, the color filters are disposed so that the lower left pixel is assigned to R, the lower right and upper left pixels to G, and the upper right pixel to B. Control signals are transmitted from a control unit that is not shown in the drawing to transfer electrodes of the vertical transfer parts 3 and horizontal transfer part 4 and thereby the operation of the solid-state image sensing device 1 is controlled. The control unit described above is provided outside the solid-state image sensing device 1 and is connected to the solid-state image sensing device 1 through signal lines. Alternatively, the control unit may be combined with the solid-state image sensing device 1 to form one unit therewith.

In the present embodiment, one transfer stage of the vertical transfer parts 3 includes three rows of photoelectric conversion parts 2 arranged in the vertical direction. With such a configuration, pixels arranged at every other pixel in three rows can be added together in the respective vertical transfer parts 3. Furthermore, there also is provided an advantage that transfer stages can have an increased capacity.

The following explanation is directed to an operation of mixing pixels arranged in the horizontal direction in the solid-state image sensing device 1.

Figure 2:
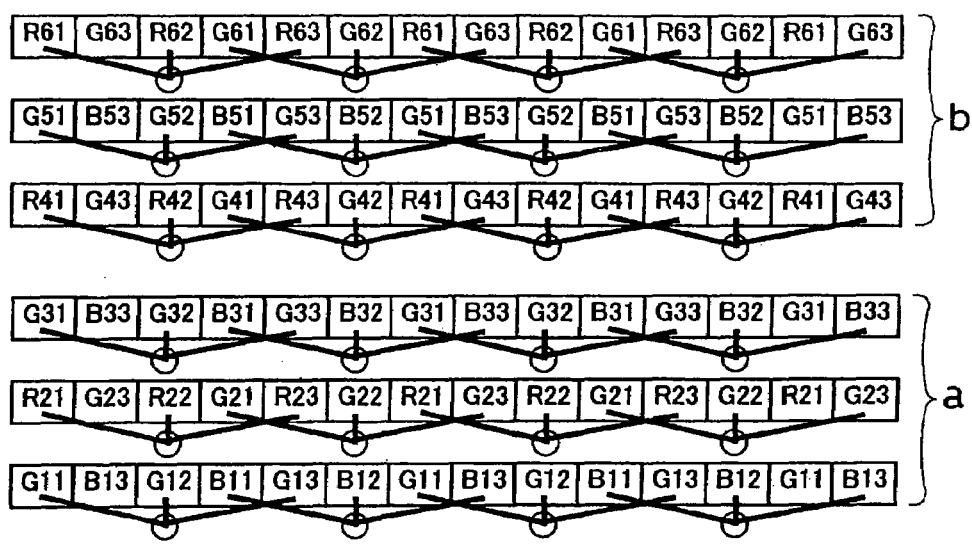
FIG. 2 is an explanatory diagram showing combinations of pixels to be mixed in the solid-state image sensing device according to an embodiment of the present invention.

With the transfer operations of the vertical transfer parts 3 and horizontal transfer part 4 controlled by the control unit (not shown in the drawing), the solid-state image sensing device 1 mixes signal charges of each of three pixels arranged at every other pixel in the horizontal direction to reduce the number of pixels arranged in the horizontal direction to one third. FIG. 2 shows combinations of pixels whose signal charges are to be mixed together. Hereinafter, a combination of pixels to be mixed together is referred to as a "pixel mixture group". In the symbols such as Rxy indicated in FIG. 2, R, G, or B indicates the color of a filter provided for a pixel concerned, x the vertical position of the pixel concerned (referred to as the first stage, the second stage, . . . sequentially from the side of the horizontal transfer part 4), and y the position of the pixel concerned within a pixel mixture group (referred to as the first, the second, . . . sequentially from the output side of the horizontal transfer part 4).

As shown in FIG. 2, in the solid-state image sensing device 1, for instance, three green pixels arranged at every other pixel such as G11, G12, and G13 form a first pixel mixture group. Further, pixel mixture groups consisting of blue pixels are determined so that their centers of gravity are spaced equally with respect to those of mixed pixels each generated from a first pixel mixture group. That is, second pixel mixture groups each consist of three pixels, which are B11 located between G12 and G13 of the first pixel mixture group, B12 that is a pixel located between the above-mentioned G13 and G11 of the second pixel mixture group adjoining the first pixel mixture group mentioned above, and B13 that is a pixel located between G11 and G12 of the pixel mixture group adjacent to the second pixel mixture group. As described above, among the pixels of two different colors located alternately in the horizontal direction, each of three pixels arranged at every other pixel are combined to be mixed together and thereby the centers of gravity of pixels of each color thus mixed are spaced equally. Consequently, no moire nor alias is generated.

Next, a procedure of driving the solid-state image sensing device 1 for mixing pixels combined as shown in FIG. 2 is described with reference to the state transition diagrams shown in FIGS. 3 to 13.

The vertical transfer parts 3 of the solid-state image sensing device 1 are configured with three columns forming one unit. In FIGS. 3 to 13, signal charges of the horizontal transfer part 4 are outputted to the side corresponding to our left, and three columns forming one unit of the vertical transfer parts 3 each are referred to as the first column, the second column, and the third column (in the drawings, indicated as Column 1, Column 2, and Column 3) sequentially from the output side of the horizontal transfer part 4. Furthermore, hereinafter the transfer stage of each vertical transfer part 3 that is closest to the horizontal transfer part 4 is referred to as a "vertical last stage".

Among the vertical last stages of the vertical transfer parts 3 configured with three columns forming one unit, both the vertical last stages of the second and third columns each are configured so as to carry out transfer operations individually and independently of both the other transfer stages of the column concerned and the vertical last stages of the other columns. In other words, while signal charges are held in the vertical last stages of the first and third columns, only signal charges of the vertical last stages of the second columns can be transferred to the horizontal transfer part 4. Furthermore, while signal charges are held in the vertical last stages of the first and second columns, only signal charges of the vertical last stages of the third columns can be transferred to the horizontal transfer part 4. Specific examples of electrode configurations of the vertical transfer parts 3 to be employed for achieving such transfer operations are described later.

Figure 3:
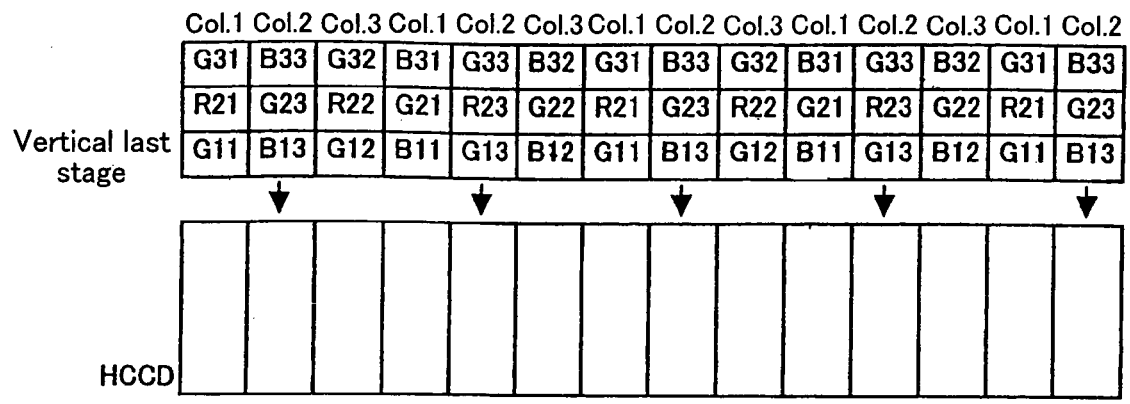
FIG. 3 is an explanatory diagram showing a step of a pixel mixing operation performed by the solid-state image sensing device according to an embodiment of the present invention.

First, as shown in FIG. 3, among the vertical last stages configured with three columns forming one unit, only the vertical last stages of the second columns are driven and thereby signal charges of the vertical last stages of the second columns alone are transferred to the horizontal transfer part 4 as shown with arrows in FIG. 3.

Figure 4:
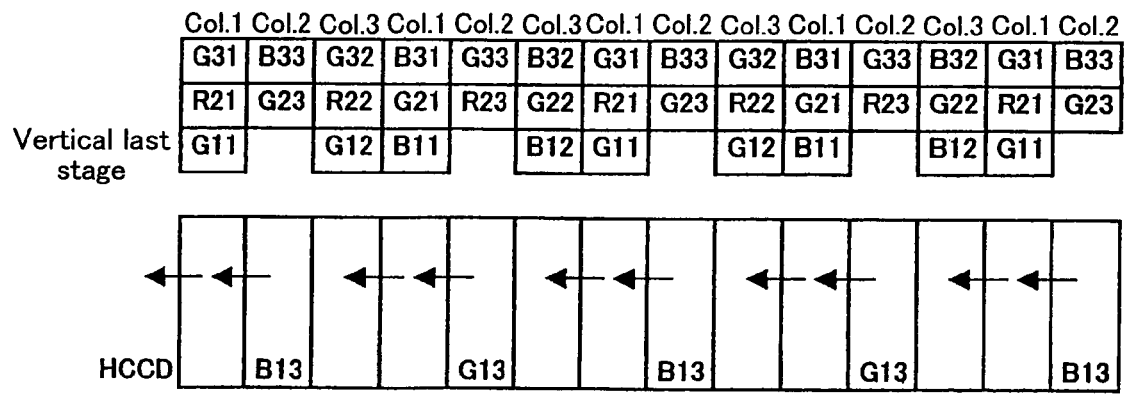
FIG. 4 is an explanatory diagram showing a step of the pixel mixing operation performed by the solid-state image sensing device according to an embodiment of the present invention.

Next, as shown in FIG. 4, the signal charges present in the horizontal transfer part 4 are transferred in the forward direction by a distance corresponding to two pixels.

Figure 5:
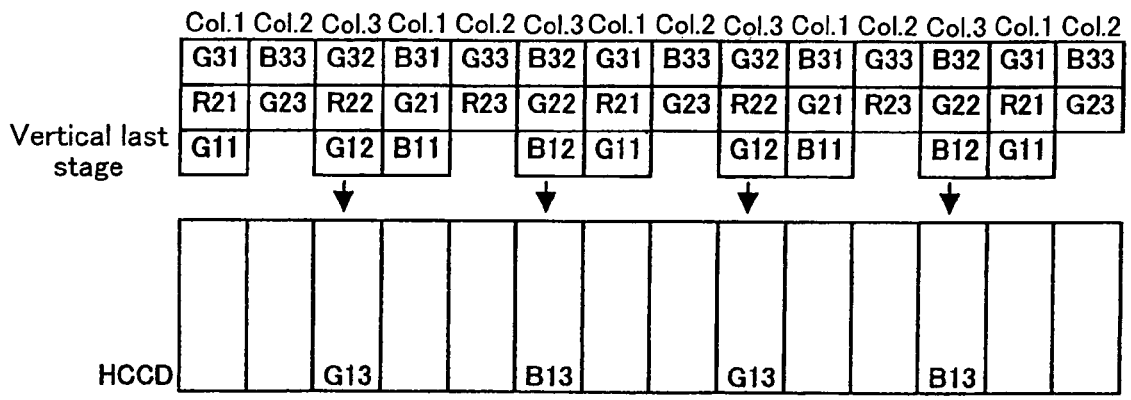
FIG. 5 is an explanatory diagram showing a step of the pixel mixing operation performed by the solid-state image sensing device according to an embodiment of the present invention.

Next, as shown in FIG. 5, among the vertical last stages configured with three columns forming one unit, only the vertical last stages of the third columns are driven and thereby signal charges of the vertical last stages of the third columns alone are transferred to the horizontal transfer part 4 as shown with arrows in FIG. 5.

Figure 6:
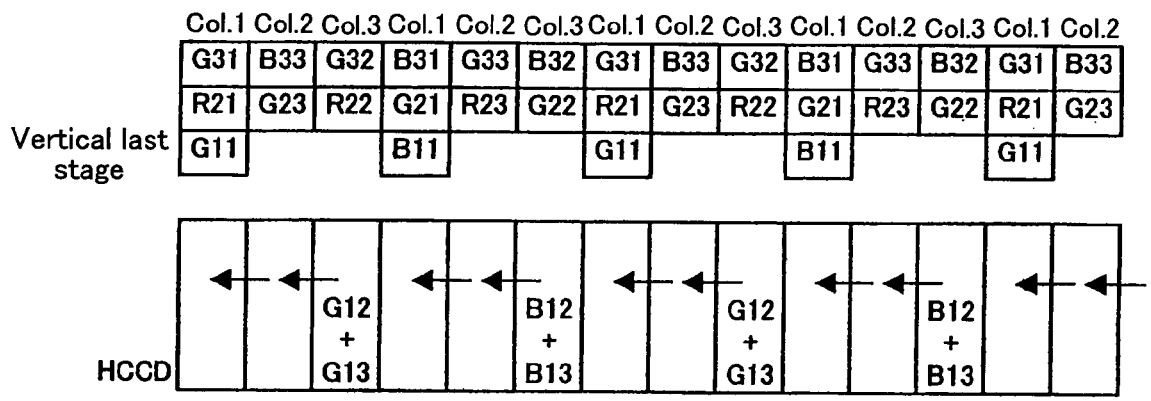
FIG. 6 is an explanatory diagram showing a step of the pixel mixing operation performed by the solid-state image sensing device according to an embodiment of the present invention.

With this transfer operation, as shown in FIG. 6, the signal charges of respective two pixels, G12 and G13 as well as B12 and B13, are mixed together in the horizontal transfer part 4. Thereafter, as shown in FIG. 6, the signal charges present in the horizontal transfer part 4 further are transferred in the forward direction by a distance corresponding to two pixels.

Figure 7:
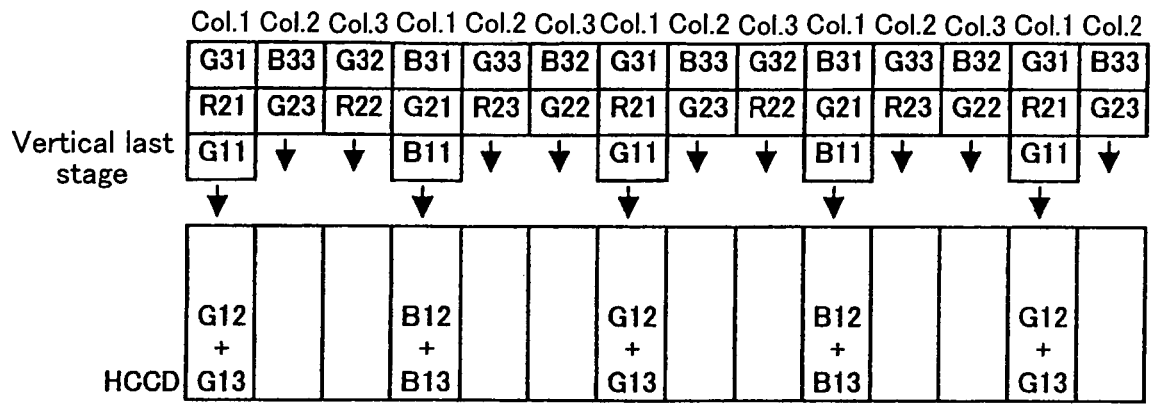
FIG. 7 is an explanatory diagram showing a step of the pixel mixing operation performed by the solid-state image sensing device according to an embodiment of the present invention.
Figure 8:
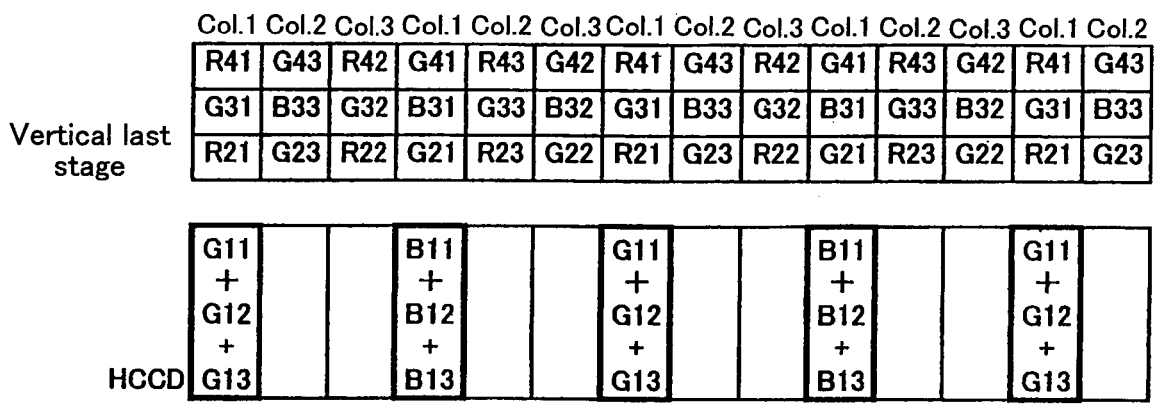
FIG. 8 is an explanatory diagram showing a step of the pixel mixing operation performed by the solid-state image sensing device according to an embodiment of the present invention.

As shown in FIG. 7, all the vertical transfer parts 3 are made to transfer signal charges vertically by one stage, and thereby as shown in FIG. 8, the signal charges of three pixels, G11, G12, and G13 as well as the signal charges of B11, B12, and B13 are mixed together in the horizontal transfer part 4, respectively. In this manner, each of three pixels arranged at every other pixel of each of two different colors included in the same stage are combined to be mixed together. Consequently, the number of pixels arranged in the horizontal direction is reduced to one third. Furthermore, as can be understood from FIG. 8, since the green mixed pixels and the blue mixed pixels are spaced equally, neither moire nor alias is generated.

From the state shown in FIG. 8, the same transfer operations as those shown in FIGS. 3 to 7 are repeated, and thereby, as shown in FIG. 9, signal charges of each three pixels arranged every other pixel that were present in the vertical last stages in the state shown in FIG. 8 are combined to be mixed together in the horizontal transfer part 4.

Further, from the state shown in FIG. 9, the same transfer operations as those shown in FIGS. 3 to 7 are repeated, and thereby, as shown in FIG. 10, signal charges of each of three pixels arranged at every other pixel that were present in the vertical last stages in the state shown in FIG. 9 are combined to be mixed together in the horizontal transfer part 4. This completes the transfer of the signal charges of all the pixels included in the three stages indicated with the character "a" in FIG. 2, to the horizontal transfer part 4.

Next, as shown in FIG. 11, the signal charges present in the horizontal transfer part 4 are outputted sequentially. Thus, the signal charges of three rows are outputted from the solid-state image sensing device 1, with the number of pixels arranged in the horizontal direction being reduced to one third.

Thereafter, through the repetition of the same transfer operations as those described above, the signal charges of all the pixels arranged in the three stages indicated with the character "b" in FIG. 2 are transferred to the horizontal transfer part 4 in the state shown in FIG. 12 and then are outputted sequentially from the horizontal transfer part 4 as shown in FIG. 13.

As described above, picture signals outputted from the horizontal transfer part 4 of the solid-state image sensing device 1 are generated with the pixels being arranged unidimensionally. Hence, in order to restore the signals to their original bidimensional arrangement, an image processor located outside the solid-state image sensing device 1 carries out a process of bidimensionally relocating the signals outputted from the horizontal transfer part 4.

For instance, the pixels included in each three stages indicated with the characters "a" and "b" in FIG. 2 are outputted from the horizontal transfer part 4 in the order shown in FIG. 14A. In FIG. 14A, the sections labeled with "Dummy" indicate pixels located in the peripheral part of the vertical CCD parts 3 and denote those in which signal charges of three pixels were not mixed together. Furthermore, a7 to a12, a13 to a18, b7 to b12, and b13 to b18 shown in FIGS. 14A and 14B are repetitions of a1 to a6 and b1 to b6 shown in FIGS. 11 and 13, respectively. However, subscripts are changed so as to clearly show their positions taken after they are arranged bidimensionally. In addition, colors of the mixed pixels arranged as shown in FIG. 14B are indicated with characters "R", "G", and "B" in FIG. 14C.

As can be understood from FIG. 14C, the solid-state image sensing device 1 allows the arrangement of the pixels to be maintained in the original state even after the number of pixels arranged in the horizontal direction is reduced to one third. Accordingly, it is possible to increase the speed at which picture signals are outputted from the solid-state image sensing device 1, without deteriorating image quality.

It is preferable that as shown in FIG. 15, one pixel mixture group is composed of nine pixels including each of three pixels arranged at every other pixel in the horizontal direction in three rows located at every other row in the vertical direction, because in this case, signal pixels of all the photodiodes can be subjected to mixing without being wasted and the sensitivity therefore can be improved. In this case, as shown in FIG. 15, the centers of gravity of the pixel mixture groups of the respective colors, R, G, and B are spaced equally. Consequently, images can be obtained that have high resolution and less moire.

In this case, for example, the following method is employed as a method of mixing signal charges of three rows located every other row in the vertical direction.

(1) First, signal charges of pixels that are arranged every three rows and correspond to one third of all the pixels are read out to the vertical transfer parts 3 and then are transferred vertically by a distance corresponding to two pixels.

(2) Next, signal charges of the pixels located second when counted in the forward direction, as from the pixels from which the signal charges have been read out the last time, are read out to the vertical transfer parts 3. They are mixed with those that have been read out the last time, which then are transferred vertically by a distance corresponding two pixels.

(3) Further, signal charges of the rest of the pixels are read out to the vertical transfer parts 3, and thereby signal charges of three pixels arranged every other pixel are mixed together.

In the case of the electrode configuration (six phases) in which one vertical transfer stage corresponds to three pixels, it is possible to carry out the above-mentioned operations. On the other hand, in the case of the electrode configuration (four phases) in which one vertical transfer stage corresponds to two pixels, since all readout electrodes corresponding to the six pixels included in three stages forming one unit are required to be independent, electrodes of eight phases are required in total.

For instance, as shown in FIG. 16, one pixel mixture group may consist of six pixels, with pixels located in the middle row in the vertical direction being excluded from the nine pixels shown in FIG. 15. Similarly in this case, the centers of gravity of the pixel mixture groups with respect to each of the colors, R, G, and B are spaced equally. Hence, images can be obtained that have high resolution and less moire.

Figure 17:
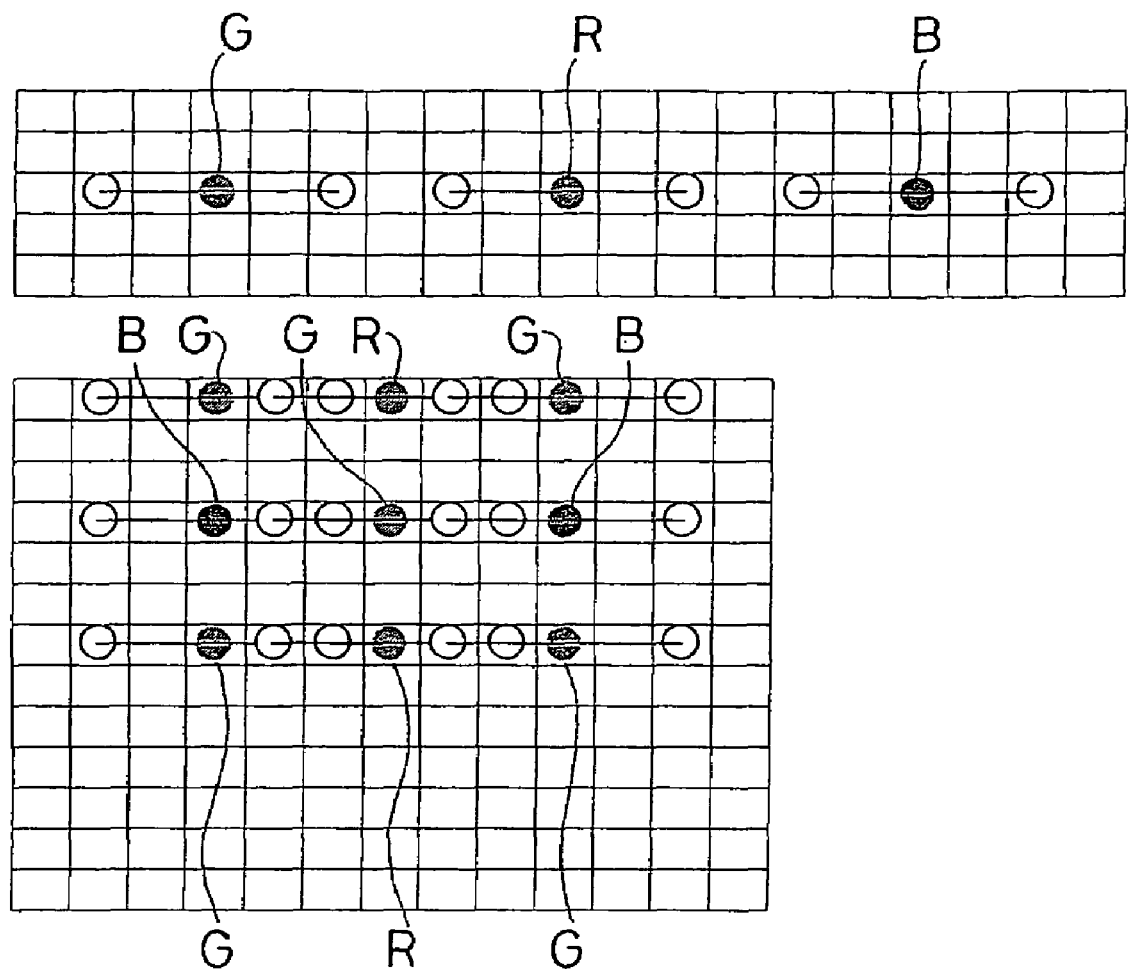
FIG. 17 is an explanatory diagram showing an example of combinations of pixels to be mixed together (pixel mixture groups) in a solid-state image sensing device according to an embodiment of the present invention.

Moreover, as shown in FIG. 17, one pixel mixture group may consist of only three pixels arranged in the horizontal direction, with two rows out of three rows arranged in the horizontal direction being excluded.

As described above, it also is possible further to increase the signal output speed by reducing the number of pixels arranged in the vertical direction through the exclusion of some rows. Examples of the method of reducing the number of pixels arranged in the vertical direction include a method in which signal charges present in unnecessary rows are kept stored in photodiodes without being read out when signal charges are read out from the photodiodes forming pixels to the vertical transfer parts 3, and thereby pixels located in the rows that were not subjected to the reading out are excluded.

In this case, the signal charges that were not read out may be discharged from the photodiodes to the substrate or the like.

Figure 18:
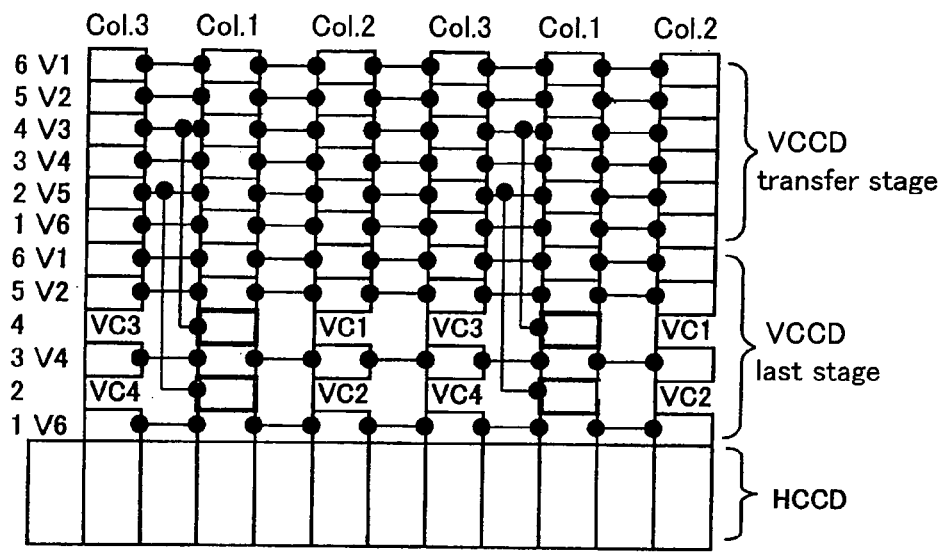
FIG. 18 is an explanatory diagram showing an example of an electrode configuration in a solid-state image sensing device according to an embodiment of the present invention.

FIG. 18 shows an example of an electrode configuration to be employed for achieving the drive mentioned above. In the electrode configuration shown in FIG. 18, the vertical transfer stages of the vertical transfer parts 3 each are formed with transfer electrodes (common electrodes) of six phases V1 to V6. The vertical last stages, however, are different in electrode configuration from the other vertical transfer stages. That is, in order to allow the vertical last stages of the second columns to carry out transfer operations independently of both the other vertical transfer stages and the vertical last stages of the other columns (i.e. the first columns and the third columns), the third phase and the fifth phase are formed of independent electrodes (VC1 and VC2) that are different from the aforementioned common electrodes. Furthermore, in order to allow the vertical last stages of the third columns to carry out transfer operations independently of both the other vertical transfer stages and the vertical last stages of the other columns (i.e. the first columns and the second columns), the third phase and the fifth phase are formed of independent electrodes (VC3 and VC4) that are different from both the aforementioned common electrodes and the independent electrodes of the second columns. The vertical last stages of the first columns are formed with the common electrodes of V1 to V6 as in the other vertical transfer stages.

Employment of such an electrode configuration permits the vertical last stages of the second and third columns each located every three columns to carry out transfer operations independently. Accordingly, the transfer operations shown in FIGS. 3 to 13 can be carried out.

Figure 19:
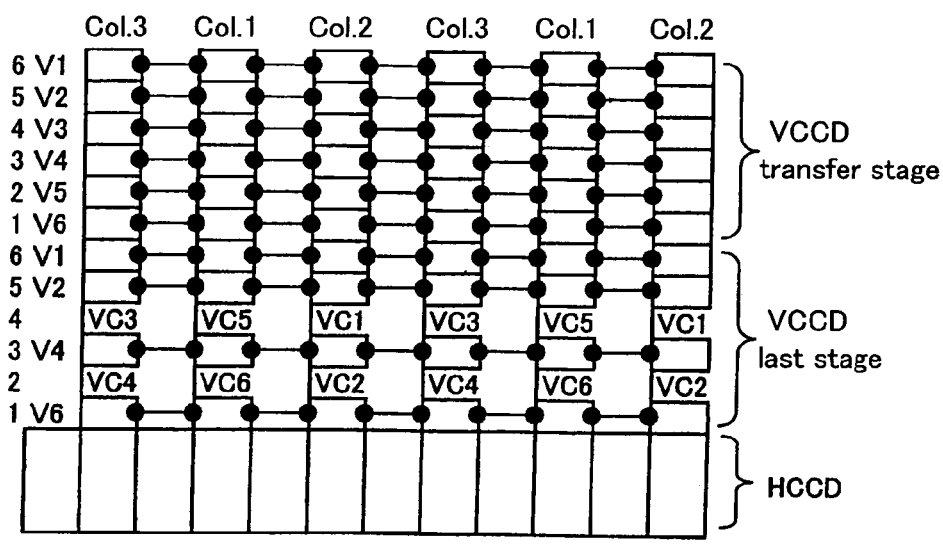
FIG. 19 is an explanatory diagram showing an example of an electrode configuration in a solid-state image sensing device according to an embodiment of the present invention.

Alternatively, as shown in FIG. 19, the vertical last stages of the first columns also may be configured with independent electrodes (VC5 and VC6) used for the third and fifth phases. When this configuration is employed, instead of the transfer operation carried out simultaneously by all the vertical transfer parts 3 in the state shown in FIG. 7, the first columns alone are subjected to the transfer operation first and then all the vertical transfer stages may be subjected to one-stage transfer.

Figure 20:
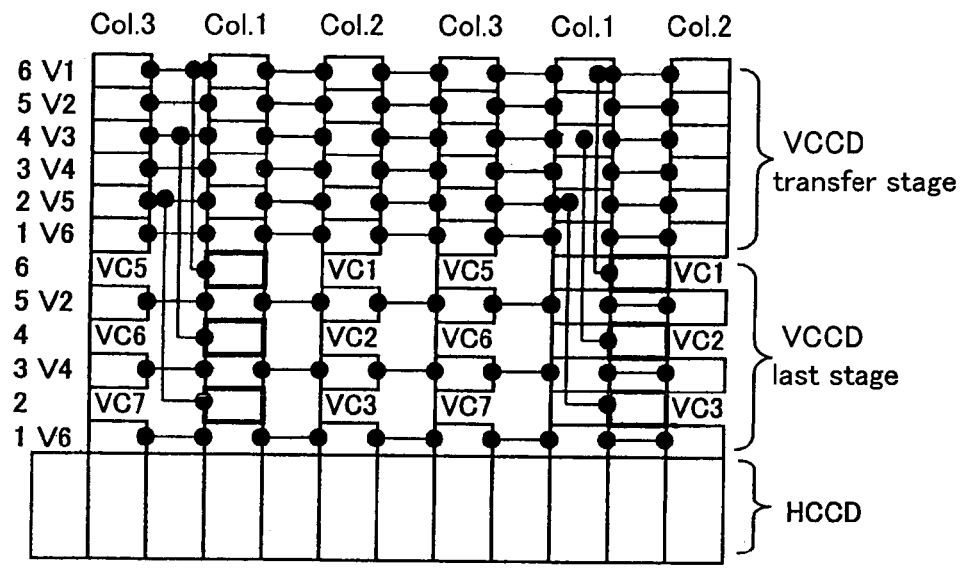
FIG. 20 is an explanatory diagram showing an example of an electrode configuration in a solid-state image sensing device according to an embodiment of the present invention.
Figure 21:
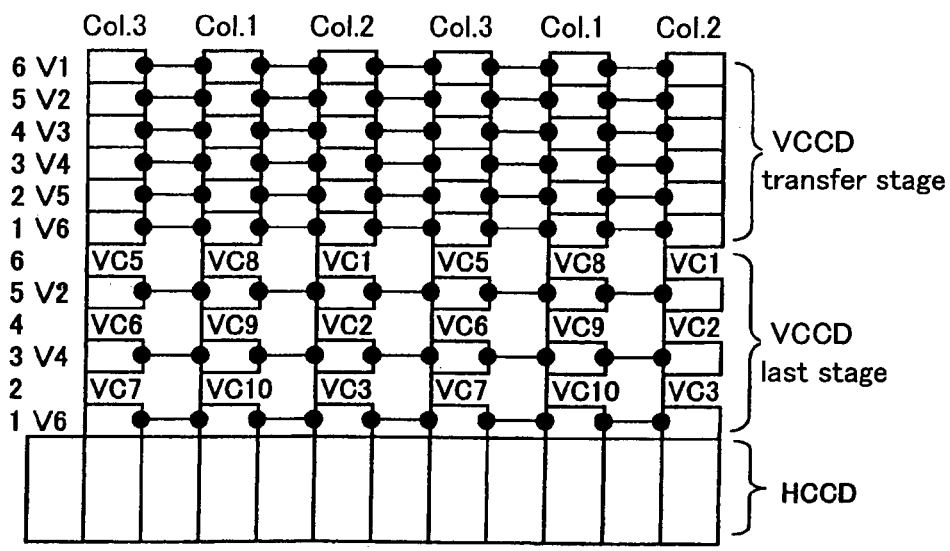
FIG. 21 is an explanatory diagram showing an example of an electrode configuration in a solid-state image sensing device according to an embodiment of the present invention.

In the case of employing the six-phase drive for the vertical transfer parts 3, it is preferable that among six electrodes provided in each of the vertical last stages of the second and third columns (or all the first to third columns), two or three of them are independent electrodes. FIGS. 20 and 21 show examples of configurations to be employed when three transfer electrodes provided in the vertical last stages are independent electrodes. It doesn't matter if these two or three independent electrodes adjoin each other. When consideration is given to the manufacturing process, however, it is preferable that at least one common electrode lies between two independent electrodes.

Accordingly, in the case of the six-phase drive, for example, it is preferable that the electrodes disposed second and fourth when counted from the horizontal transfer part 4 side are independent electrodes as shown in each of FIGS. 18 and 19, or the electrodes disposed second, fourth, and sixth when counted from the horizontal transfer part 4 side are independent electrodes as shown in each of FIGS. 20 and 21. The electrode configuration of the vertical last stages, however, is not limited to these specific examples.

In the present embodiment, the electrode configurations for six-phase drive were described as examples, but three- or four-phase drive also may be employed. In the case of three- or four-phase drive, however, two independent electrodes are used.

Figure 22:
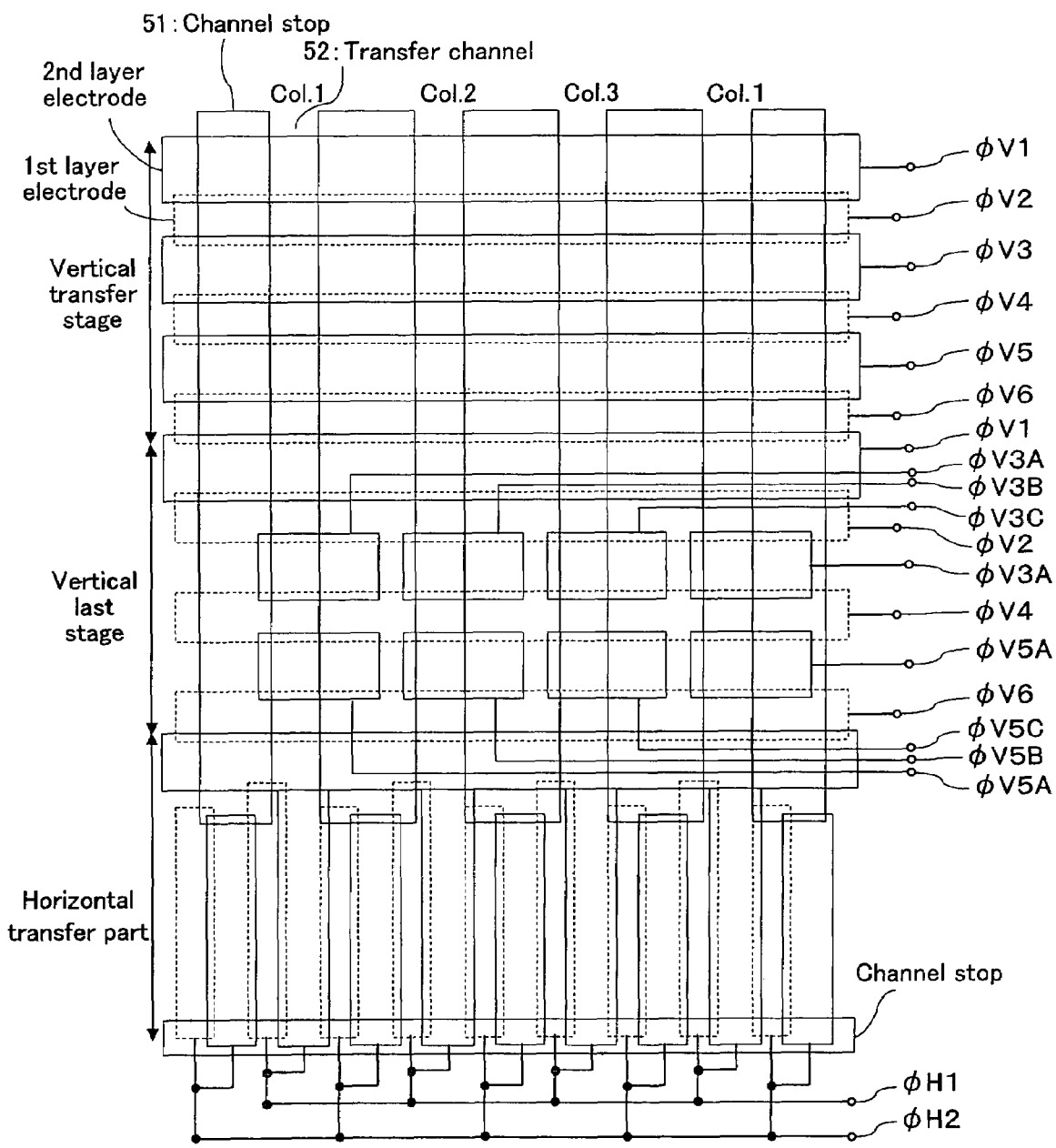
FIG. 22 is a plan view showing an example of specific arrangement of gate electrodes in a solid-state image sensing device according to an embodiment of the present invention.

FIG. 22 shows an example of a specific arrangement of gate electrodes employed in the electrode configurations like those shown in FIGS. 18 and 19. In FIG. 22, transfer channels 52 each formed between two channel stops 51 serve as vertical transfer parts 3. In the example shown in FIG. 22, in the transfer stages other than the vertical last stages of the vertical transfer parts 3, three transfer electrodes V2, V4, and V6 are formed of electrode films disposed in one layer (first-layer electrodes), as common electrodes to all the columns. In the same manner, three transfer electrodes V1, V3, and V5 also are formed of electrode films disposed in one layer (second-layer electrodes) located above the first-layer electrodes, as common electrodes to all the columns. On the other hand, in the vertical last stages, an electrode film that is identical to that used for the second-layer electrodes is formed into a pattern in which insular parts are separated from each other and are arranged corresponding to the respective columns, and thereby the transfer electrodes of the third and fifth phases (the electrodes disposed second and fourth when counted as from the horizontal transfer part 4 side) are formed as independent electrodes $\phi$V3A to $\phi$V3C and $\phi$V5A to $\phi$V5C, respectively. As shown in FIG. 18, when the vertical last stages of the first columns are not driven independently, the electrodes $\phi$V3A and $\phi$V5A shown in FIG. 22 may be connected to the terminals to which electrodes $\phi$V3 and $\phi$V5 are connected, respectively.

Figure 29:
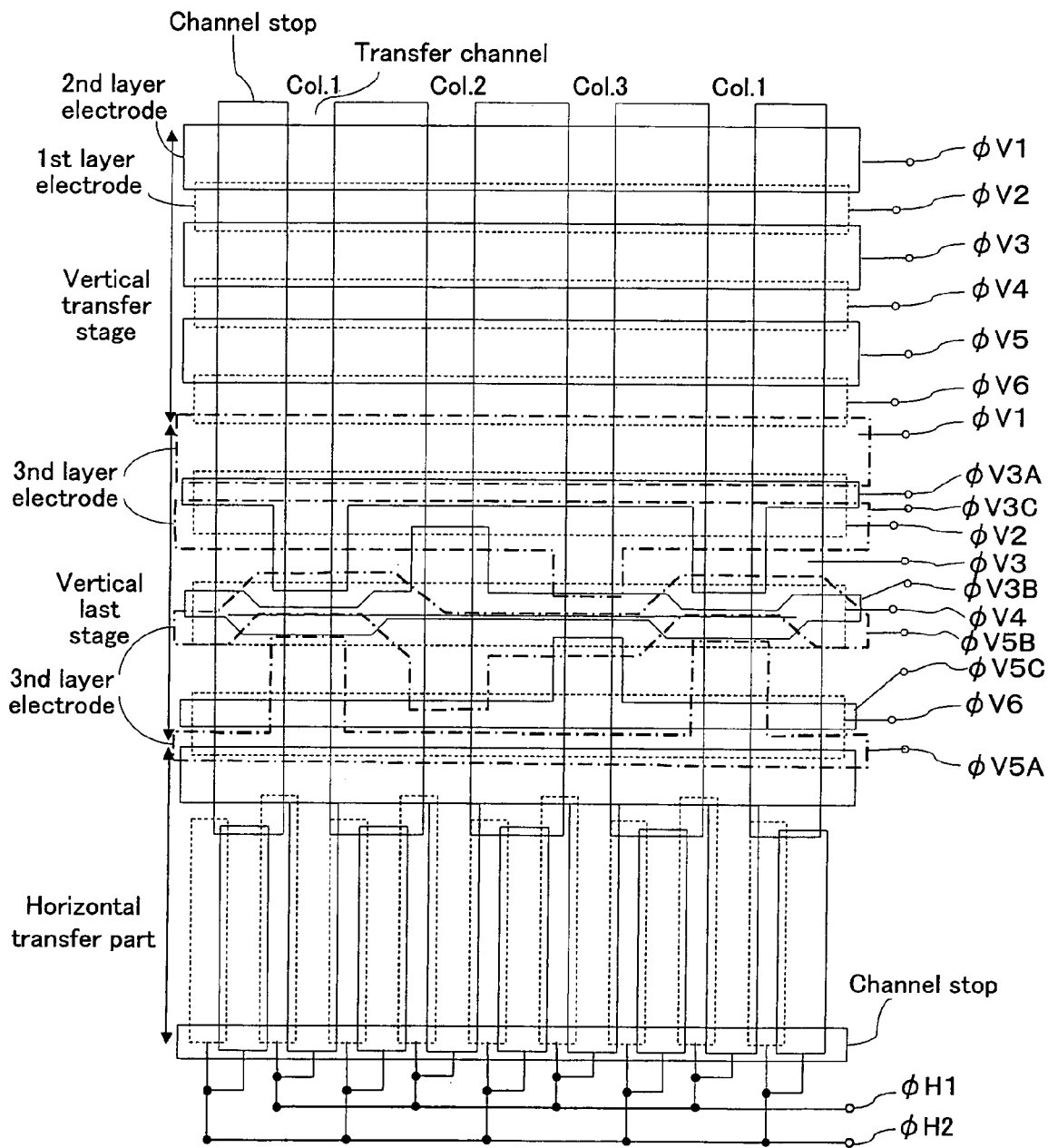
FIG. 29 is a plan view showing another example of specific arrangement of gate electrodes in a solid-state image sensing device according to an embodiment of the present invention.

The gate electrode configuration shown in FIG. 22 is illustrated as an example in which the gate electrodes are formed of the first-layer or second-layer transfer electrodes. As shown in FIG. 29, however, the transfer electrodes may be formed of any one of the first- to third-layer electrode films. In the example shown in FIG. 29, in the transfer stages other than the vertical last stages of the vertical transfer parts 3, three transfer electrodes V2, V4, and V6 are formed of electrode films disposed in one layer (the first-layer electrodes), as common electrodes to all the columns, respectively. Similarly, three transfer electrodes V1, V3, and V5 also are formed of electrode films disposed in one layer (the second-layer electrodes) above the first-layer electrodes, as common electrodes to all the columns, respectively. On the other hand, in the vertical last stages, the transfer electrodes V1, V3C, V5A, and V5B are formed of third-layer transfer electrodes, the transfer electrodes V3A, V3B, and V5C are formed of transfer electrodes disposed in the second layer, and the transfer electrodes V2, V4, and V6 are formed of transfer electrodes disposed in the first layer.

With this configuration, transfer electrodes of the third- and fifth-phases (i.e. the electrodes disposed second and fourth when counted as from the horizontal transfer part 4 side) are formed as independent electrodes $\phi$V3A to $\phi$V3C and $\phi$V5A to $\phi$V5C. As shown in FIG. 18, when the vertical last stages of the first columns are not driven independently, the electrodes $\phi$V3A and $\phi$V5A shown in FIG. 29 may be connected to the terminals to which the electrodes $\phi$V3 and $\phi$V5 are connected, respectively.

In the example shown in FIG. 29, the electrodes V1, V3C, V5A, and V5B are formed of the electrode films disposed in the third layer, but the electrode films of the respective transfer electrodes are not limited thereto. In the gate electrode configuration shown in FIG. 29, the gate electrodes are formed of any one of the electrode films disposed in the first to third layers but may be formed using electrode films disposed in the fourth layer or any layer located above it. In the gate electrode configuration shown in FIG. 22, since the transfer electrodes can be formed in two layers, the electrode films are formed relatively easily, but due to the pattern of independent electrodes separated from each other as insular parts, separate wiring is required for connecting independent electrodes of one gate to each other. On the contrary, when transfer electrodes are formed of the electrode films disposed in the third layer or any layer located above it, since independent electrodes of one gate are connected to each other through one electrode film, no separate wiring is required, which is a beneficial.

Figure 23:
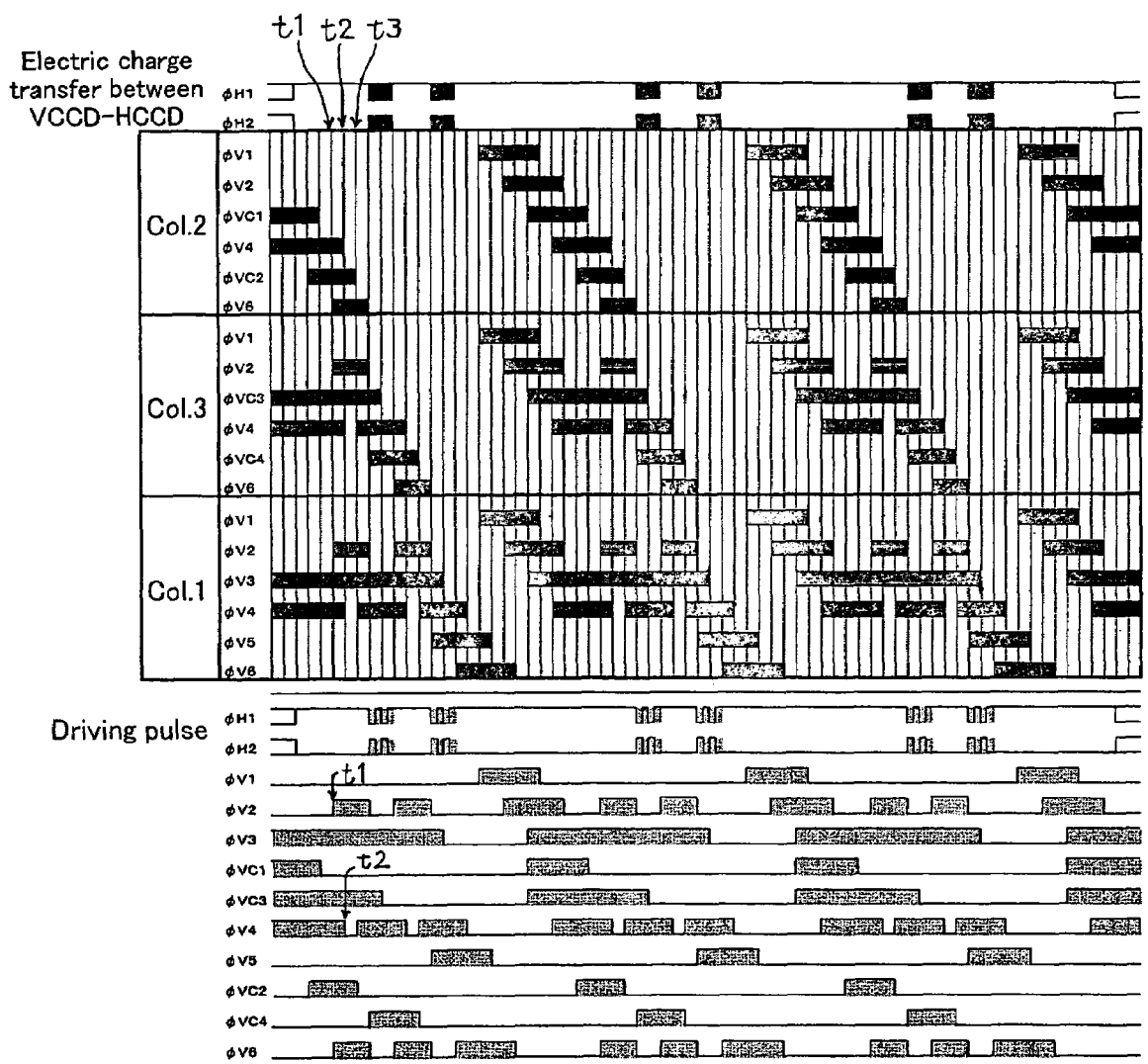
FIG. 23 is an explanatory diagram showing a timing chart indicating the timing of control signals and a state of charges transferred according to this timing chart in a solid-state image sensing device according to an embodiment of the present invention.
Figure 24:
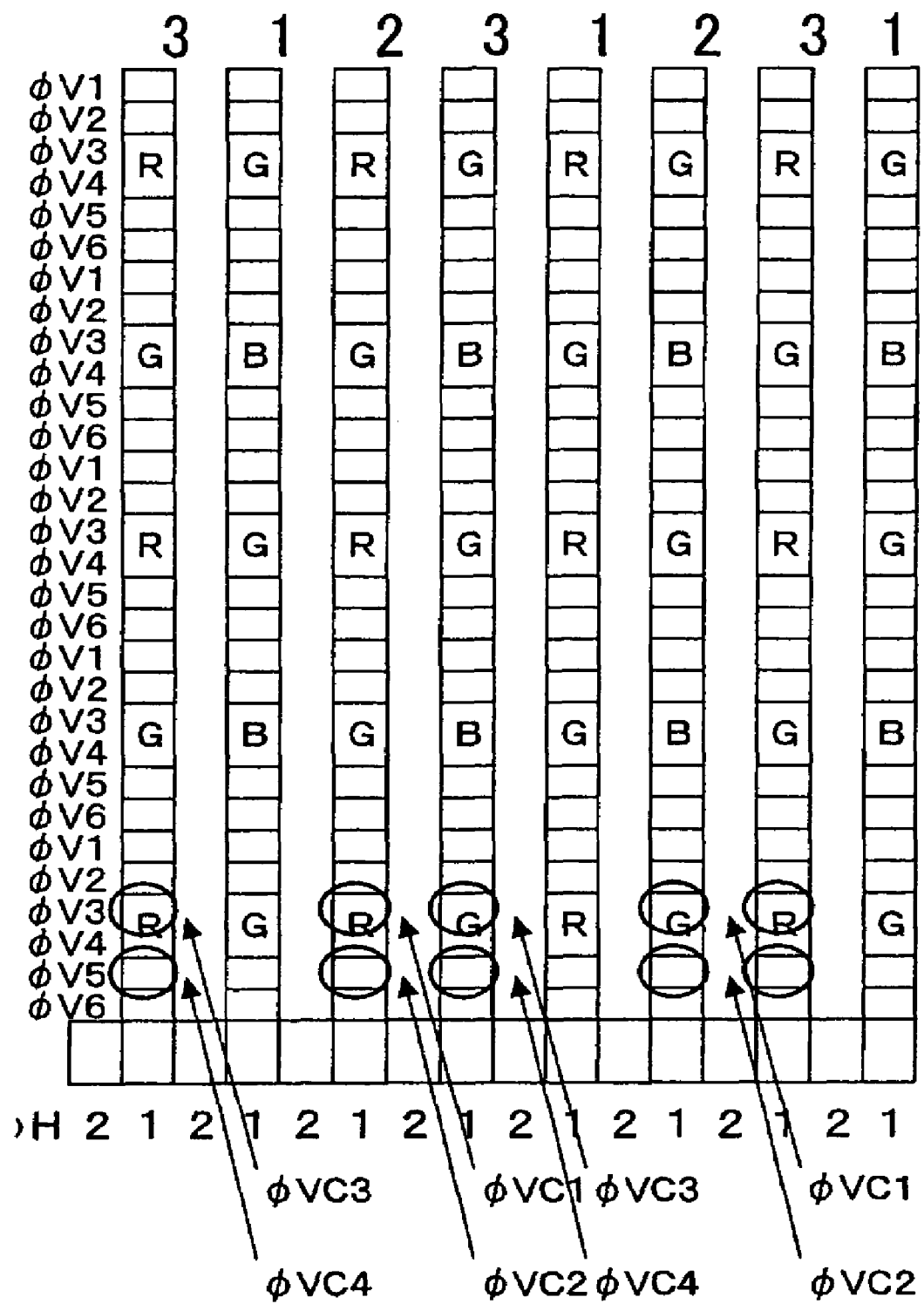
FIG. 24 is an explanatory diagram showing a state of signal charges in a solid-state image sensing device according to an embodiment of the present invention.

With the electrode configuration shown in FIG. 18 used as an example, FIG. 23 shows a timing chart indicating the timing of control signals to be applied to the respective transfer electrodes of the vertical transfer parts 3 and the horizontal transfer part 4 from the control unit (not illustrated), and the state of transfer charges corresponding to the timing chart. In the case of this electrode configuration, as shown in FIG. 24, the signal charges read out from the photoelectric conversion parts 2 are stored in the transfer electrodes V3 and V4.

In FIG. 23, when a high level of driving pulse is applied to the respective electrodes V1 to V6 and VC1 to VC4, these electrodes serve as storage parts, while they serve as barrier parts when a low level of driving pulse is applied thereto.

Pixel mixing as described in the present embodiment can be achieved by driving the vertical transfer parts 3 and the horizontal transfer part 4 according to the timing chart shown in FIG. 23. As shown in FIG. 23, it is preferable that the electrode $\phi$V2 is set at a higher level (at t1) before the timing (t2) in which the electrode $\phi$V4 is set at a lower level. When the electrode $\phi$V2 is set at a higher level at the time t1, the electrodes that store signal charges are $\phi$V3 and $\phi$V4 before the time t1, $\phi$V2, $\phi$V3 ($\phi$VC3), and $\phi$V4 during the period between times t1 and t2, and $\phi$V2 and $\phi$V3 ($\phi$VC3) during the period between times t2 and t3. This provides an advantage that signal charges of the vertical transfer stages that are not to be transferred are prevented from being lost during the period in which signal charges are transferred to the horizontal transfer part 4.

Figure 25:
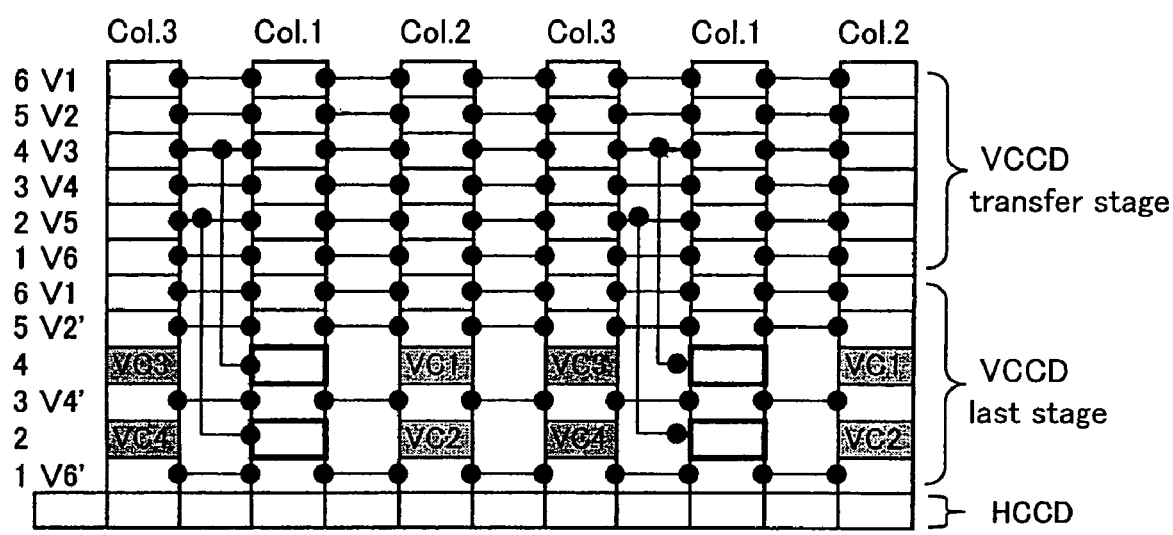
FIG. 25 is an explanatory diagram showing an example of an electrode configuration in a solid-state image sensing device according to an embodiment of the present invention.
Figure 26:
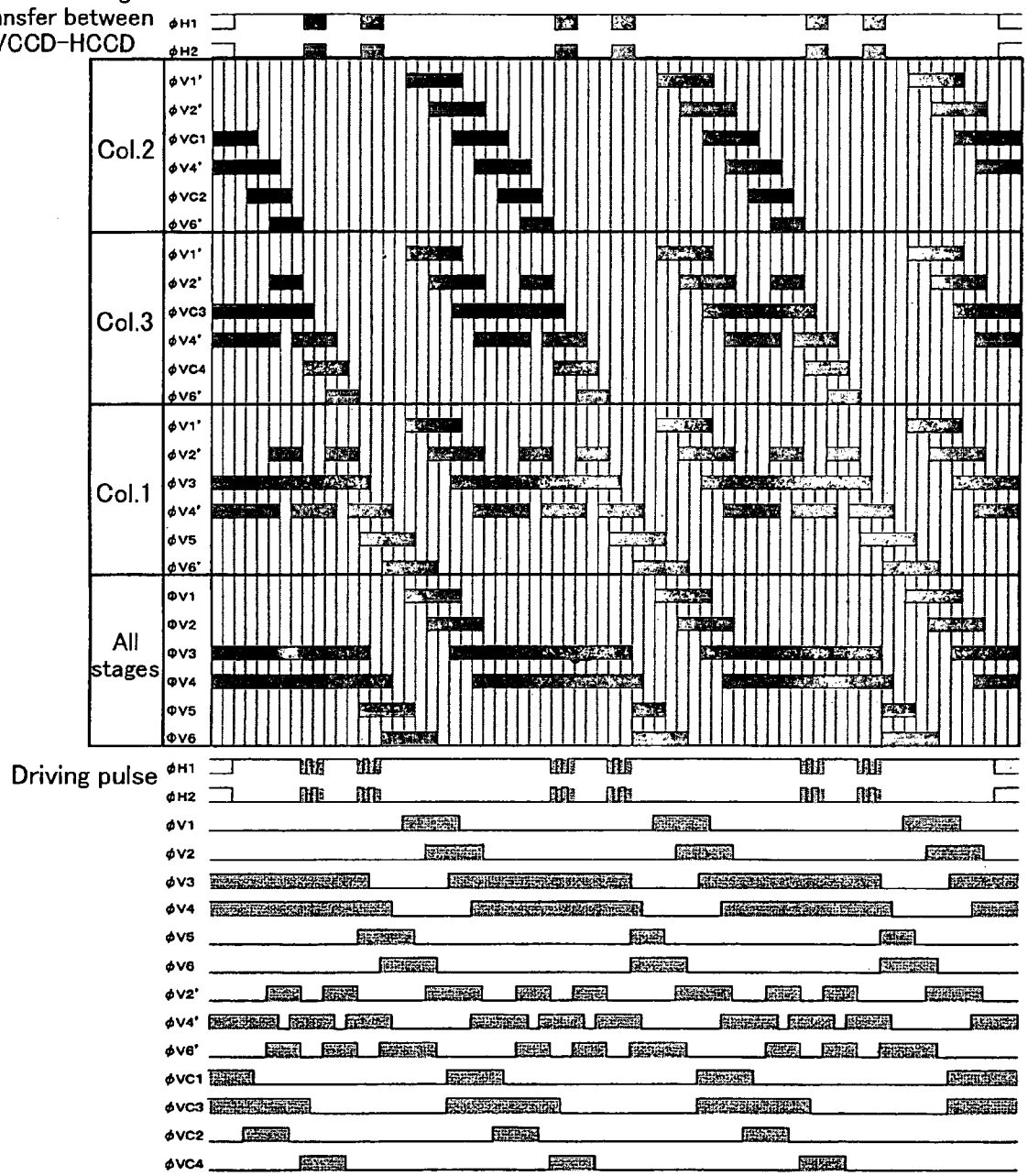
FIG. 26 is an explanatory diagram showing a timing chart indicating the timing of control signals and a state of charges transferred according to this timing chart in a solid-state image sensing device according to an embodiment of the present invention.

FIG. 25 shows an example in which in the vertical last stages of two of three columns adjoining each other, the transfer electrodes disposed second and fourth when counted from the horizontal transfer part side are independent electrodes that are independent of the vertical last stages of the other columns, and in all the vertical last stages of the three columns adjoining each other, the transfer electrodes that are disposed first, third, and fifth when counted as from the horizontal transfer part side are different from those of the other stages of the respective vertical transfer parts. FIG. 26 shows a timing chart indicating the timing of control signals to be applied to the respective transfer electrodes and the state of transfer charges corresponding to the timing chart. The operation shown in FIG. 26 is different from that shown in FIG. 23 in that when charges of the vertical last stages of the first and second columns are transferred selectively to the horizontal CCDs, only the electrodes VC1 to VC4, V2', V4', and V6' of the electrodes provided in the vertical last stages are driven, and only when charges of the third columns are transferred selectively to the horizontal CCDs, pulses are applied to the electrodes including V1 to V6 that are common to the whole screen and thereby the charges are transferred. Accordingly, power consumption can be reduced as compared to that of the configuration example shown in FIG. 23. In this connection, the electrode V2' provided in the vertical last stages shown in FIG. 25 may be identical to the electrode V2 of the other stages of the vertical transfer parts.

Figure 27:
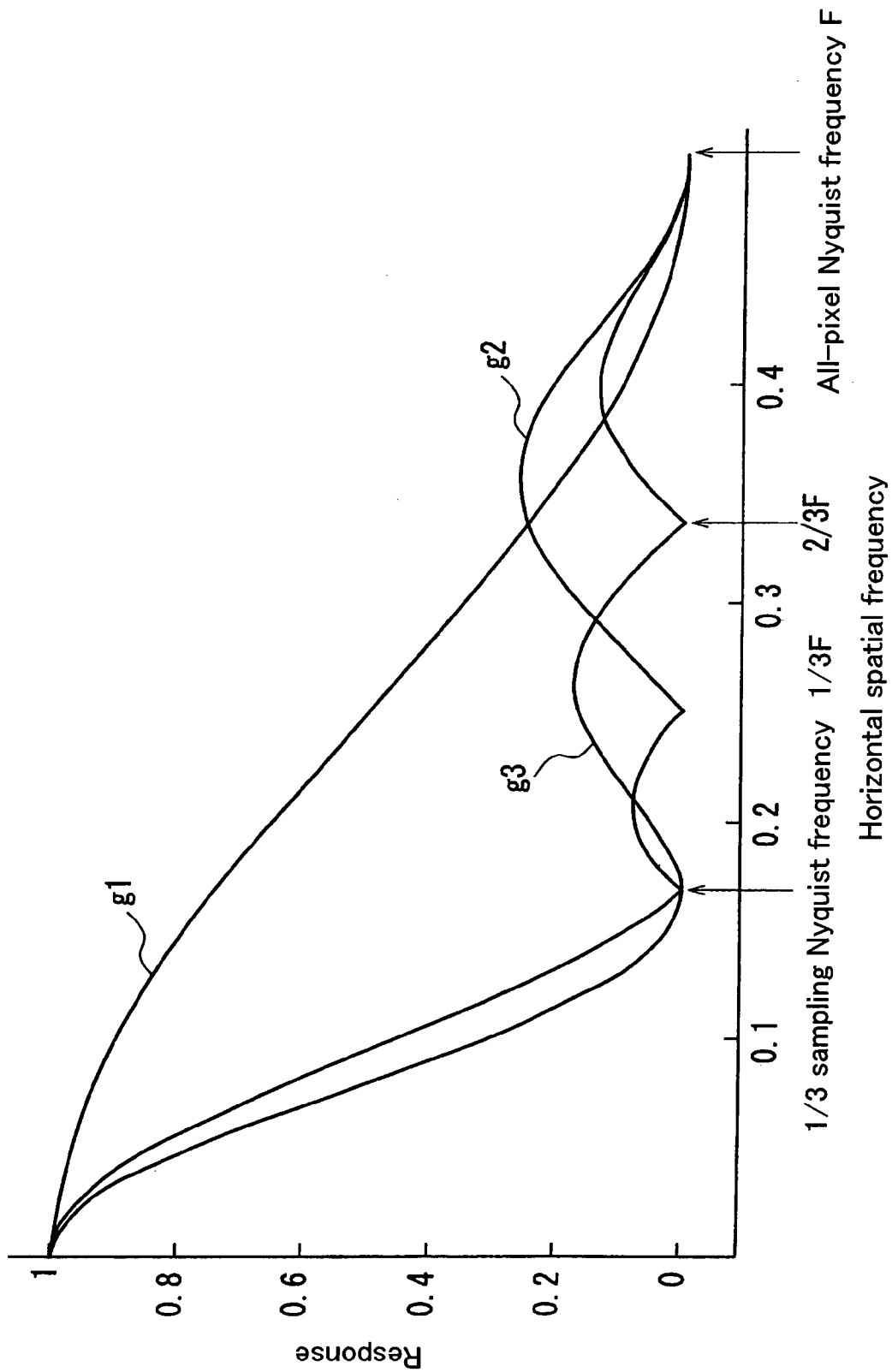
FIG. 27 is a graph showing the spatial frequency response of a solid-state image sensing device according to an embodiment of the present invention.

FIG. 27 is a graph showing a horizontal spatial frequency response. In FIG. 27, g1 indicates a frequency response in the case of using all the pixels without mixing pixels. An all-pixel Nyquist frequency Fhas a relationship with an all-pixel sampling frequency f, which is expressed by a formula of F=1/2×f. When sampling is carried out at a frequency that is one third the frequency normally used, through exclusion of pixels or the like, since components at higher frequencies than a Nyquist frequency ⅓F generate aliasing errors, the component at ⅔F is added to a DC component. In FIG. 27, g2 indicates a frequency response obtained when two pixels located right and left out of three pixels arranged horizontally are mixed together as in Patent Document 1 described above. In this case, since the Nyquist frequency is ⅓F and the component at ⅔F is about 0.25, aliasing errors are added to DC to generate aliases. In FIG. 27, g3 indicates a frequency response obtained when three pixels arranged at every other pixel are mixed together according to the present invention. The Nyquist frequency is ⅓F, but the component at ⅔F is zero. Consequently, there are almost no aliasing errors to be added to DC. As shown in FIG. 27, the solid-state image sensing device 1 allows high-quality picture signals with less moire and aliases to be obtained.

In the above-mentioned embodiment, the description was directed to the configuration and driving method for mixing each of three pixels arranged in the horizontal direction together. The present invention, however, can be used for mixing three pixels or pixels whose number is odd and higher than three. Based on the description of the present embodiment, persons skilled in the art would understand the configuration and driving method for mixing five pixels or more.

Furthermore, the present invention is not limited to the solid-state image sensing device with the filters arranged as shown in FIG. 1 but can be used for that with filters arranged differently therefrom. Furthermore, the present invention can be used for solid-state image sensing devices for monochrome images with no color filters employed therein.

Figure 28:
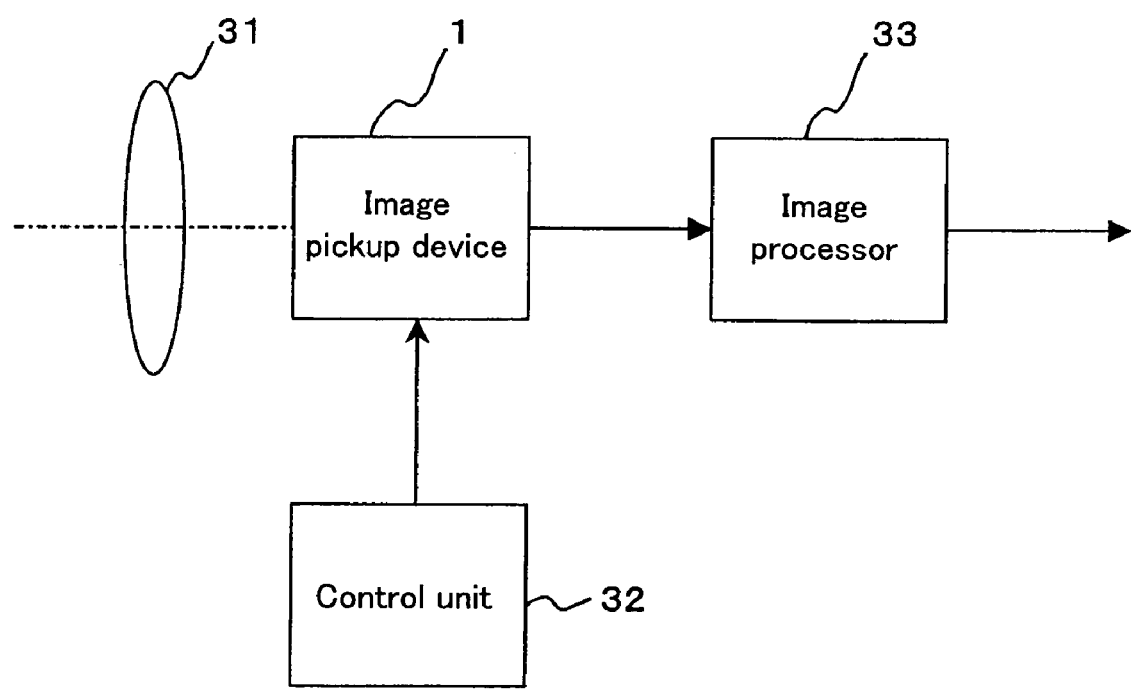
FIG. 28 is a block diagram showing a schematic configuration of a camera according to an embodiment of the present invention.

When a solid-state image sensing device described in the present embodiment is used for a digital camera, since data are outputted from the solid-state image sensing device at high speed, a digital camera can be obtained that can operate at high speed and is excellent in image quality. Since the high-speed operation of the present invention and the normal operation of reading out all pixels can be switched therebetween, a digital camera can be obtained that is provided with both a moving picture (the high-speed operation) mode and a still picture (the operation of reading out all pixels) mode. FIG. 28 shows an example of the configuration of a digital camera according to the present invention. The digital camera is provided with: an optical system 31 including a lens for focusing light incident from a subject on an imaging plane of the solid-state image sensing device 1; a control unit 32 that controls drive of the solid-state image sensing device 1; and an image processor 33 that carries out various signal processing with respect to signals outputted from the solid-state image sensing device 1.

In the digital camera according to the present invention, when no color filter is provided for the solid-state image sensing device and pixels arranged consecutively in the horizontal direction are subjected to mixing, images to be obtained can be colored by using a dichroic mirror or the like (a so-called three-plate type color camera). Furthermore, in the case of the three-plate type color camera, it is preferable that with m being set at 2 (m=2), its operation mode is selectively switchable between at least two modes including a first mode of carrying out no pixel mixing and a second mode of mixing two pixels adjacent to each other in the horizontal direction as well as two pixels adjacent to each other in the vertical direction.

Second Embodiment

The following description is directed to a solid-state image sensing device according to a second embodiment of the present invention.

The basic configuration of the solid-state image sensing device according to the present embodiment is almost the same as that of the solid-state image sensing device (see FIG. 22) according to the first embodiment. The solid-state image sensing device of the present embodiment, however, is different from that of the first embodiment in the method of driving the vertical transfer parts 3 and the horizontal transfer part 4.

The solid-state image sensing device of the present embodiment has a configuration in which the vertical last stages have transfer electrodes formed to have identical configurations repeated every m (m denotes an integer of 2 or higher) columns, and transfer electrodes that are independent of those of the vertical last stages of the other columns are provided in all the vertical last stages of the m columns in order to control the operation of transferring signal charges to the horizontal transfer part 4 independently of the other columns. The configuration and operation of the solid-state image sensing device according to the present embodiment are described below using a specific example in which m=3. When m=3, the configuration of the solid-state image sensing device is identical to that shown in FIG. 22 in the first embodiment.

Operations of the solid-state image sensing device according to the present embodiment are described below with reference to FIGS. 30 to 47. In FIGS. 30 to 47, respective signal charges read out to the vertical transfer parts 3 are numbered and movements of the signal charges are indicated with the numbers. In FIG. 30 and so on, only 8×8 pixels are shown. However, it should be understood that there is a column including numbers 19, 29, . . . and 89 provided on the right side of the column including numbers 18, 28, . . . and 88, and further on the right side thereof is provided a column including numbers 110, 210, . . . and 810, which then is followed by a column including numbers 111, 211, . . . and 811 provided further on the right side thereof.

FIG. 30 shows a state where signal charges have been read out from the respective pixels of the photoelectric conversion parts 2 to the vertical transfer parts 3. From this state, first, only transfer electrodes provided in the vertical last stages, of the vertical transfer parts 3, of columns located every three columns are allowed to carry out a transfer operation. Consequently, as shown in FIG. 31, among the signal charges of the vertical last stages of the vertical transfer parts 3, signal charges of the above-mentioned columns located every three columns are transferred to the horizontal transfer part 4. Next, as shown in FIG. 32, the signal charges present in the horizontal transfer part 4 are transferred horizontally in the forward direction by a distance corresponding to one pixel.

Furthermore, as shown in FIG. 33, only transfer electrodes provided in the vertical last stages of the vertical transfer parts 3, of columns (that are different from those subjected to the transfer shown in FIG. 31) located at every three columns are allowed to carry out a transfer operation. Consequently, among the signal charges of the vertical last stages of the vertical transfer parts 3, signal charges of the above-mentioned columns located every three columns are transferred to the horizontal transfer part 4. With this transfer, signal charges of two of each three columns are mixed together in the horizontal transfer part 4. Subsequently, as shown in FIG. 34, the signal charges present in the horizontal transfer part 4 are transferred horizontally in the forward direction by a distance corresponding to one pixel.

Next, as shown in FIG. 35, only transfer electrodes provided in the vertical last stages, of the vertical transfer parts 3 of columns (that are different from those subjected to the transfer shown in FIGS. 31 and 33) located every three columns, are allowed to carry out a transfer operation. Consequently, among the signal charges of the vertical last stages of the vertical transfer parts 3, signal charges of the abovementioned columns located at every three columns are transferred to the horizontal transfer part 4. With the transfer operations described above, as shown in FIG. 35, the signal charges of the vertical last stages of the vertical transfer parts 3 of each of three columns are mixed together in the horizontal transfer part 4.

Next, as shown in FIG. 36, all the transfer stages of the vertical transfer parts 3 are subjected to an operation of vertically transferring signal charges toward the vertical last stages by one stage.

Thereafter, with respect to the signal charges (21 to 28) located in the vertical last stages shown in FIG. 36, the vertical transfer and the horizontal transfer are repeated in the same procedure as that described above (FIGS. 37 to 41). Consequently, the signal charges of each of three columns are mixed together in the horizontal transfer part 4.

Figures 42, 43:
FIG. 42 is an explanatory diagram showing a step of the pixel mixing operation performed by the solid-state image sensing device according to an embodiment of the present invention.
FIG. 43 is an explanatory diagram showing a step of the pixel mixing operation performed by the solid-state image sensing device according to an embodiment of the present invention.

Furthermore, as shown in FIG. 42, all the transfer stages of the vertical transfer parts 3 are subjected to an operation of vertically transferring signal charges toward the vertical last stages by one stage. With respect to the signal charges (31 to 38) located in the vertical last stages, the vertical transfer and the horizontal transfer are repeated in the same procedure as that described above (FIGS. 42 to 47). Consequently, the signal charges of each three columns are mixed together in the horizontal transfer part 4.

Figures 46, 47:
FIG. 46 is an explanatory diagram showing a step of the pixel mixing operation performed by the solid-state image sensing device according to an embodiment of the present invention.
FIG. 47 is an explanatory diagram showing a step of the pixel mixing operation performed by the solid-state image sensing device according to an embodiment of the present invention.

Thereafter, the signal charges of three stages that have been mixed in the horizontal transfer part 4 as shown in FIG. 47 are outputted sequentially from the horizontal transfer part 4.

As described above, the solid-state image sensing device of the present embodiment can implement three-pixel mixing.

In the present embodiment, an example was described in which each of three pixels adjoining each other in the horizontal direction were mixed together in the horizontal transfer part 4. However, the pixels to be mixed together are not necessarily required to adjoin each other. For instance, when color filters are provided, it is preferable that pixels provided with filters having the same color are mixed together. On the other hand, in the case of a solid-state image sensing device with no color filters, it is preferable that pixels adjoining each other are mixed together, since no deterioration in spatial frequency characteristics is caused in this case.

In the present embodiment, the description was directed to the example in which m=3. However, it should be easy for persons skilled in the art to understand that even in the case where m=2 or m=4 or a higher number, mixing of m pixels can be implemented by repeating the vertical transfer and the horizontal transfer of signal charges of columns located every m columns.

Moreover, in the case where, for example, m=6, i.e. the vertical last stages have transfer electrodes formed to have identical configurations repeated every six columns and transfer electrodes of five or all of the six columns are formed to be independent of the other columns so as to carry out the operation of transferring signal charges to the horizontal transfer part independently of the other columns, the operation can be carried out in four types of modes that are a six-pixel mixing mode, a three-pixel mixing mode, a two-pixel mixing mode, and a zero-pixel mixing mode, by changing the pattern of control signals sent to the vertical transfer parts 3 and the horizontal transfer part 4. That is, theoretically, it is possible to arbitrarily achieve modes of mixing pixels whose number corresponds to any aliquot of a unit (the number) of transfer electrodes that has one of the repeated identical configurations of the transfer electrodes disposed in the vertical last stages.

The above-mentioned modes of mixing a plurality of pixels are described by means of an example in which color filters are provided in a so-called Bayer array as shown in FIG. 48, for example. In FIG. 48, the characters R, G, and B indicate colors of filters provided corresponding to respective pixels. In this case, a nine-pixel mixing mode and a four-pixel mixing mode can be implemented using a solid-state image sensing device in which m=12, i.e. the vertical last stages have transfer electrodes formed to have identical configurations repeated every twelve columns and transfer electrodes of eleven or all of the twelve columns are configured to be independent of the other columns so that the operation of transferring signal charges to the horizontal transfer part can be carried out independently of the other columns. In the nine-pixel mixing mode, nine pixels of each of the colors R, G, and B are mixed together by mixing nine pixels arranged in three stages located every other stage in the vertical direction, with three pixels arranged every other pixel in the horizontal direction in each of the three stages. On the other hand, in the four-pixel mixing mode, four pixels of each of the colors R, G, and B are mixed together by mixing four pixels arranged in two stages located every other stage in the vertical direction, with two pixels arranged every other pixel in the horizontal direction in each of the two stages.

In the case described above, the mixing of pixels in the vertical direction may be carried out in the vertical transfer stages or in the horizontal transfer part.

Third Embodiment

The following description is directed to a solid-state image sensing device according to still another embodiment of the present invention.

The solid-state image sensing device of the present embodiment has the same configuration as that of the second embodiment but is different from the second embodiment in that combinations of pixels to be mixed together vary stage by stage.

With respect to the case where m=2, specific operations are described with reference to FIGS. 49 to 57. In FIGS. 49 to 57, respective signal charges read out to the vertical transfer parts 3 are numbered and the movements of the signal charges are indicated with the numbers. In FIG. 49 and so on, only 8×8 pixels are shown. However, it should be understood that there is a column including numbers 19, 29, . . . and 89 provided on the right side of the column including numbers 18, 28, . . . and 88, and further on the right side thereof is provided a column including numbers 110, 210, . . . and 810.

FIG. 49 shows a state where signal charges have been read out from the respective pixels of the photoelectric conversion parts 2 to the vertical transfer parts 3. From this state, first, among the transfer electrodes of the vertical last stages of the vertical transfer parts 3, only those provided in even-numbered columns are allowed to carry out a transfer operation as shown in FIG. 50. Consequently, among the signal charges of the vertical last stages of the vertical transfer parts 3, those of the columns located every two columns are transferred to the horizontal transfer part 4. Next, as shown in FIG. 51, the signal charges present in the horizontal transfer part 4 are transferred horizontally in the forward direction by a distance corresponding to one pixel.

As shown in FIG. 52, among the transfer electrodes of the vertical last stages of the vertical transfer parts 3, only those provided in odd-numbered columns are allowed to carry out a transfer operation. Consequently, among the signal charges of the vertical last stages of the vertical transfer parts 3, those of columns located at every two columns are transferred to the horizontal transfer part 4. With this transfer operation, signal charges of the vertical last stages of each two columns are mixed together in the horizontal transfer part 4.

Next, as shown in FIG. 53, all the transfer stages of the vertical transfer parts 3 are subjected to an operation of vertically transferring signal charges toward the vertical last stages by one stage. Subsequently, as shown in FIG. 54, the signal charges present in the horizontal transfer part 4 are transferred horizontally in the forward direction by a distance corresponding to one pixel. Thereafter, as shown in FIG. 55, among the transfer electrodes of the vertical last stages of the vertical transfer parts 3 only those provided in odd-numbered columns are allowed to carry out a transfer operation. Consequently, among the signal charges of the vertical last stages of the vertical transfer parts 3, those of columns located at every two columns are transferred to the horizontal transfer part 4. Next, as shown in FIG. 56, the signal charges present in the horizontal transfer part 4 are transferred horizontally in the forward direction by a distance corresponding to one pixel. Subsequently, as shown in FIG. 57, among the transfer electrodes of the vertical last stages of the vertical transfer parts 3, only those provided in the even-numbered columns are allowed to carry out the transfer operation. Accordingly, among signal charges of the vertical last stages of the vertical transfer parts 3, those of columns located every two columns are transferred to the horizontal transfer part 4. With this transfer operation, signal charges of the vertical last stages of each two columns are mixed together in the horizontal transfer part 4.

Thereafter, the same operations as those shown in FIGS. 49 to 57 are repeated.

With this procedure, in the present embodiment, signal charges of each of two pixels arranged in the odd-numbered stages (signal charges numbered as x1 to x8 in FIG. 49, where x is an odd number) are mixed together by the combinations of number x1 and number x2, number x3 and number x4, number x5 and number x6, and number x7 and number x8. On the other hand, signal charges of each two pixels arranged in the even-numbered stages (signal charges numbered as x1 to x8 in FIG. 49, where x is an even number) are mixed together by the combinations of number x2 and number x3, number x4 and number x5, number x6 and number x7, and number x8 and number x9.

Accordingly, as indicated with circles in FIG. 58, centers of gravity of each two pixels to be mixed together in the odd-numbered stages and those of each two pixels to be mixed together in the even-numbered stages are arranged alternately and proportionally. In this manner, the centers of gravity of groups of pixels to be mixed together are spaced equally in the horizontal direction. This provides the advantage that the visual resolution improves and thereby sharper picture images can be obtained.

As in the solid-state image sensing device according to the first embodiment, when the solid-state image sensing devices according to the second and third embodiments each are used in a digital camera (see FIG. 28), data are outputted from the solid-state image sensing device used therein at high speed. Consequently, digital cameras can be obtained that can operate at high speed and are excellent in image quality. Furthermore, when they are used, the high-speed operation according to the present invention and the normal operation of reading out all pixels can be switched therebetween. Accordingly, a digital camera can be obtained that is provided with both a moving picture (a high-speed operation) mode and a still picture (an operation of reading out all pixels) mode.

It also is preferable to produce a digital camera using any one of the solid-state image sensing devices according to the first to third embodiments that allows its mode to be switched between a mode of outputting signal charges of all pixels without carrying out pixel mixing and a mode of carrying out four-pixel mixing. Such a digital camera can output images, for instance, in a HDTV moving picture mode (1000 pixels arranged vertically×2000 pixels arranged horizontally), which serves as the mode involving no pixel mixing, and a SDTV moving picture mode (500 pixels arranged vertically×1000 pixels arranged horizontally), which serves as the mode of carrying out the four-pixel mixing. In the HDTV moving picture mode, high resolution picture images can be outputted while in the SDTV moving picture mode, picture images with high sensitivity and a high frame rate can be outputted.

Furthermore, solid-state image sensing devices having at least about eight million pixels, more specifically, solid-state image sensing devices having at least 2160 pixels arranged vertically and at least 3840 pixels arranged horizontally are produced so that their mode can be switched selectively between at least two modes including an imaging mode for a TV format with 720 scanning lines provided by mixing nine pixels of (three pixels arranged vertically)×(three pixels arranged horizontally) and an imaging mode for a TV format with 1080 scanning lines provided by mixing four pixels of (two pixels arranged vertically)×(two pixels arranged horizontally). This makes it possible to switch the mode between a mode of outputting picture images with high resolution and a mode of outputting picture images with high sensitivity and a high frame rate.

Moreover, when an imaging mode is employed in which 16 pixels of (four pixels arranged vertically)×(four pixels arranged horizontally) are mixed together, an imaging mode for a NTSC system in which the number of scanning lines is 480 or a PAL system in which the number of scanning lines is 575 can be implemented.

Such digital cameras may have a configuration including a solid-state image sensing device provided with color filters or may be a so-called three-plate type camera in which color images are obtained through separation of light into rays of different colors using a dichroic mirror with no color filters being provided for the solid-state image sensing device included therein. As described before, when the solid-state image sensing device is provided with color filters, it is preferable that pixels provided with filters having the same color are mixed together. On the other hand, in the case of the three-plate type camera, preferably a plurality of pixels adjoining each other are mixed together.

INDUSTRIAL APPLICABILITY

The present invention can be used for solid-state image sensing devices that can output high quality picture signals at high speed without generating moire or aliases through the reduction in at least the number of pixels arranged in the horizontal direction.

What is claimed is:

1. A solid-state image sensing device comprising:
vertical transfer parts provided corresponding to respective columns of bidimensionally arranged pixels to vertically transfer signal charges read out from the pixels; and
a horizontal transfer part for horizontally transferring the signal charges received from the vertical transfer parts,
wherein the vertical transfer parts include transfer stages, those located closest to the horizontal transfer part being vertical last stages, and the vertical last stages have transfer electrodes formed to have identical configurations repeated every m (m denotes an integer of 2 or higher) columns,
vertical last stages of columns other than one of the m columns or all vertical last stages of the m columns each are provided with a transfer electrode that is independent of those of other vertical last stages of the m columns so that an operation of transferring signal charges from the vertical last stages concerned to the horizontal transfer part is controlled independently of said other vertical last stages,
the integer m is 2n+1 (n denotes an integer of 1 or higher), and
signal charges of pixels included in each of first and second pixel mixture groups are added together in the horizontal transfer part,
where the first pixel mixture groups each are composed of 2n+1 (n denotes an integer of 1 or higher) pixels arranged at every other pixel in a horizontal direction of the bidimensionally arranged pixels, and
the second pixel mixture groups each are composed of 2n+1 pixels that are arranged at every other pixel and are pixels other than those of the first pixel mixture groups in the horizontal direction of the bidimensionally arranged pixels, with centers of gravity of the pixels of the respective second pixel mixture groups each being located at an equal distance from centers of gravity of the pixels of two first pixel mixture groups adjacent thereto,
wherein the vertical last stages located closest to the horizontal transfer part of the vertical transfer parts have transfer electrodes formed to have identical configurations repeated every three columns,
vertical last stages of at least the second and third columns of the three columns, counted as from an output side of the horizontal transfer part, each are provided with a transfer electrode that is independent of those of the other vertical last stages so that an operation of transferring signal charges from the respective vertical last stages concerned to the horizontal transfer part is controlled independently of the other vertical last stages,
a vertical last stage of each column is formed with more than four transfer electrodes, and
in all vertical transfer parts of three columns adjoining each other, among the six transfer electrodes, those located second and fourth from a side of the horizontal transfer part are independent electrodes that are independent of those of vertical last stages of the other columns, and the electrodes other than those located second and fourth are electrodes common to the other stages of the respective vertical transfer parts.

2. A solid-state image sensing device comprising:
vertical transfer parts provided corresponding to respective columns of bidimensionally arranged pixels to vertically transfer signal charges read out from the pixels; and
a horizontal transfer part for horizontally transferring the signal charges received from the vertical transfer parts,
wherein the vertical transfer parts include transfer stages, those located closest to the horizontal transfer part being vertical last stages, and the vertical last stages have transfer electrodes formed to have identical configurations repeated every m (m denotes an integer of 2 or higher) columns,
vertical last stages of columns other than one of them columns or all vertical last stages of the m columns each are provided with a transfer electrode that is independent of those of other vertical last stages of the m columns so that an operation of transferring signal charges from the vertical last stages concerned to the horizontal transfer part is controlled independently of said other vertical last stages,
the integer m is 2n+1 (n denotes an integer of 1 or higher), and
signal charges of pixels included in each of first and second pixel mixture groups are added together in the horizontal transfer part,
where the first pixel mixture groups each are composed of 2n+1 (n denotes an integer of 1 or higher) pixels arranged at every other pixel in a horizontal direction of the bidimensionally arranged pixels, and
the second pixel mixture groups each are composed of 2n+1 pixels that are arranged at every other pixel and are pixels other than those of the first pixel mixture groups in the horizontal direction of the bidimensionally arranged pixels, with centers of gravity of the pixels of the respective second pixel mixture groups each being located at an equal distance from centers of gravity of the pixels of two first pixel mixture groups adjacent thereto,
wherein the vertical last stages located closest to the horizontal transfer part of the vertical transfer parts have transfer electrodes formed to have identical configurations repeated every three columns,
vertical last stages of at least the second and third columns of the three columns, counted as from an output side of the horizontal transfer part, each are provided with a transfer electrode that is independent of those of the other vertical last stages so that an operation of transferring signal charges from the respective vertical last stages concerned to the horizontal transfer part is controlled independently of the other vertical last stages,
a vertical last stage of each column is formed with more than four transfer electrodes,
in vertical transfer parts of two of three columns adjoining each other, among the transfer electrodes, those located second and fourth from a side of the horizontal transfer part are independent electrodes that are independent of those of vertical last stages of the other columns and the electrodes other than those located second and fourth are electrodes common to the other stages of the respective vertical transfer parts, and
in a vertical transfer part of remaining one of the three columns adjoining each other, all the transfer electrodes are electrodes common to the other stages of the vertical transfer part concerned.

3. A solid-state image sensing device comprising:
vertical transfer parts provided corresponding to respective columns of bidimensionally arranged pixels to vertically transfer signal charges read out from the pixels; and
a horizontal transfer part for horizontally transferring the signal charges received from the vertical transfer parts,
wherein the vertical transfer parts include transfer stages, those located closest to the horizontal transfer part being vertical last stages, and the vertical last stages have transfer electrodes formed to have identical configurations repeated every m (m denotes an integer of 2 or higher) columns, vertical last stages of columns other than one of the m columns or all vertical last stages of the m columns each are provided with a transfer electrode that is independent of those of other vertical last stages of them columns so that an operation of transferring signal charges from the vertical last stages concerned to the horizontal transfer part is controlled independently of said other vertical last stages, the integer m is 2n+1 (n denotes an integer of 1 or higher), and signal charges of pixels included in each of first and second pixel mixture groups are added together in the horizontal transfer part, where the first pixel mixture groups each are composed of 2n+1 (n denotes an integer of 1 or higher) pixels arranged at every other pixel in a horizontal direction of the bidimensionally arranged pixels, and the second pixel mixture groups each are composed of 2n+1 pixels that are arranged at every other pixel and are pixels other than those of the first pixel mixture groups in the horizontal direction of the bidimensionally arranged pixels, with centers of gravity of the pixels of the respective second pixel mixture groups each being located at an equal distance from centers of gravity of the pixels of two first pixel mixture groups adjacent thereto, wherein the vertical last stages located closest to the horizontal transfer part of the vertical transfer parts have transfer electrodes formed to have identical configurations repeated even three columns, vertical last stages of at least the second and third columns of the three columns, counted as from an output side of the horizontal transfer part, each are provided with a transfer electrode that is independent of those of the other vertical last stages so that an operation of transferring signal charges from the respective vertical last stages concerned to the horizontal transfer part is controlled independently of the other vertical last stages, a vertical last stage of each column is formed with more than six transfer electrodes, and in all vertical transfer parts of three columns adjoining each other, among the transfer electrodes, those located second, fourth, and sixth from a side of the horizontal transfer part are independent electrodes that are independent of those of vertical last stages of the other columns, and the electrodes other than those located second, fourth, and sixth are electrodes common to the other stages of the respective vertical transfer parts.

4. A solid-state image sensing device comprising:

vertical transfer parts provided corresponding to respective columns of bidimensionally arranged pixels to vertically transfer signal charges read out from the pixels; and a horizontal transfer part for horizontally transferring the signal charges received from the vertical transfer parts, wherein the vertical transfer parts include transfer stages, those located closest to the horizontal transfer part being vertical last stages, and the vertical last stages have transfer electrodes formed to have identical configurations repeated every in (m denotes an integer of 2 or higher) columns, vertical last stages of columns other than one of them columns or all vertical last stages of the in columns each are provided with a transfer electrode that is independent of those of other vertical last stages of the in columns so that an operation of transferring signal charges from the vertical last stages concerned to the horizontal transfer part is controlled independently of said other vertical last stages, the integer in is 2n+1 (n denotes an integer of 1 or higher), and signal charges of pixels included in each of first and second pixel mixture groups are added together in the horizontal transfer part, where the first pixel mixture groups each are composed of 2n+1 (n denotes an integer of 1 or higher) pixels arranged at every other pixel in a horizontal direction of the bidimensionally arranged pixels, and the second pixel mixture groups each are composed of 2n+1 pixels that are arranged at every other pixel and are pixels other than those of the first pixel mixture groups in the horizontal direction of the bidimensionally arranged pixels, with centers of gravity of the pixels of the respective second pixel mixture groups each being located at an equal distance from centers of gravity of the pixels of two first pixel mixture groups adjacent thereto, wherein the vertical last stages located closest to the horizontal transfer part of the vertical transfer parts have transfer electrodes formed to have identical configurations repeated every three columns, vertical last stages of at least the second and third columns of the three columns, counted as from an output side of the horizontal transfer part, each are provided with a transfer electrode that is independent of those of the other vertical last stages so that an operation of transferring signal charges from the respective vertical last stages concerned to the horizontal transfer part is controlled independently of the other vertical last stages, a vertical last stage of each column is formed with more than six transfer electrodes, in vertical transfer parts of two of three columns adjoining each other, among the transfer electrodes, those located second, fourth, and sixth from a side of the horizontal transfer part are independent electrodes that are independent of those of vertical last stages of the other columns and the electrodes other than those located second, fourth, and sixth are electrodes common to the other stages of the respective vertical transfer parts, and in a vertical transfer part of a remaining one of the three columns adjoining each other, all the transfer electrodes are electrodes common to the other stages of the vertical transfer part concerned.

5. A solid-state image sensing device comprising:

vertical transfer parts provided corresponding to respective columns of bidimensionally arranged pixels to vertically transfer signal charges read out from the pixels; and a horizontal transfer part for horizontally transferring the signal charges received from the vertical transfer parts, wherein the vertical transfer parts include transfer stages, those located closest to the horizontal transfer part being vertical last stages, and the vertical last stages have transfer electrodes formed to have identical configurations repeated every m (in denotes an integer of 2 or higher) columns, vertical last stages of columns other than one of the m columns or all vertical last stages of the m columns each are provided with a transfer electrode that is independent of those of other vertical last stages of the m columns so that an operation of transferring signal charges from the vertical last stages concerned to the horizontal transfer part is controlled independently of said other vertical last stages, the integer m is 2n+1 (n denotes an integer of 1 or higher), and signal charges of pixels included in each of first and second pixel mixture groups are added together in the horizontal transfer part, where the first pixel mixture groups each are composed of 2n+1 (n denotes an integer of 1 or higher) pixels arranged at every other pixel in a horizontal direction of the bidimensionally arranged pixels, and the second pixel mixture groups each are composed of 2n+1 pixels that are arranged at every other pixel and are pixels other than those of the first pixel mixture groups in the horizontal direction of the bidimensionally arranged pixels, with centers of gravity of the pixels of the respective second pixel mixture groups each being located at an equal distance from centers of gravity of the pixels of two first pixel mixture groups adjacent thereto, wherein the vertical last stares located closest to the horizontal transfer part of the vertical transfer parts have transfer electrodes formed to have identical configurations repeated every three columns, vertical last stages of at least the second and third columns of the three columns, counted as from an output side of the horizontal transfer part, each are provided with a transfer electrode that is independent of those of the other vertical last stages so that an operation of transferring signal charges from the respective vertical last stages concerned to the horizontal transfer part is controlled independently of the other vertical last stages, a vertical last stage of each column is formed with more than four transfer electrodes, and in vertical transfer parts of at least two of three columns adjoining each other, among the transfer electrodes, those located second and fourth from a side of the horizontal transfer part are independent electrodes that are independent of those of vertical last stages of the other columns, and in vertical transfer parts of all the three columns adjoining each other, those located first and third from the side of the horizontal transfer part are different electrodes from those provided in the other stages of the respective vertical transfer parts.

6. A solid-state image sensing device comprising:

vertical transfer parts provided corresponding to respective columns of bidimensionally arranged pixels to vertically transfer signal charges read out from the pixels; and a horizontal transfer part for horizontally transferring the signal charges received from the vertical transfer parts, wherein the vertical transfer parts include transfer stages, those located closest to the horizontal transfer part being vertical last stages, and the vertical last stages have transfer electrodes formed to have identical configurations repeated every m (m denotes an integer of 2 or higher) columns, vertical last stages of columns other than one of the m columns or all vertical last stages of the m columns each are provided with a transfer electrode that is independent of those of other vertical last stages of the m columns so that an operation of transferring signal charges from the vertical last stages concerned to the horizontal transfer part is controlled independently of said other vertical last stages, the integer m is 2n+1 (n denotes an integer of 1 or higher), and signal charges of pixels included in each of first and second pixel mixture groups are added together in the horizontal transfer part, where the first pixel mixture groups each are composed of 2n+1 (n denotes an integer of 1 or higher) pixels arranged at every other pixel in a horizontal direction of the bidimensionally arranged pixels, and the second pixel mixture groups each are composed of 2n+1 pixels that are arranged at every other pixel and are pixels other than those of the first pixel mixture groups in the horizontal direction of the bidimensionally arranged pixels, with centers of gravity of the pixels of the respective second pixel mixture groups each being located at an equal distance from centers of gravity of the pixels of two first pixel mixture groups adjacent thereto, wherein the vertical last stages located closest to the horizontal transfer part of the vertical transfer parts have transfer electrodes formed to have identical configurations repeated every three columns, vertical last stages of at least the second and third columns of the three columns, counted as from an output side of the horizontal transfer part, each are provided with a transfer electrode that is independent of those of the other vertical last stages so that an operation of transferring signal charges from the respective vertical last stages concerned to the horizontal transfer part is controlled independently of the other vertical last stages, a vertical last stage of each column is formed with more than six transfer electrodes, and in vertical transfer parts of at least two of three columns adjoining each other, among the transfer electrodes, those located second, fourth, and sixth from a side of the horizontal transfer part are independent electrodes that are independent of those of vertical last stages of the other columns, and in vertical transfer parts of all the three columns adjoining each other, those located first, third, and fifth from the side of the horizontal transfer part are different electrodes from those provided in the other stages of the respective vertical transfer parts.

7. A solid-state image sensing device comprising:

vertical transfer parts provided corresponding to respective columns of bidimensionally arranged pixels to vertically transfer signal charges read out from the pixels; and a horizontal transfer part for horizontally transferring the signal charges received from the vertical transfer parts, wherein the vertical transfer parts include transfer stages, those located closest to the horizontal transfer part being vertical last stages, and the vertical last stages have transfer electrodes formed to have identical configurations repeated every m (m denotes an integer of 2 or higher) columns, vertical last stages of columns other than one of them columns or all vertical last stares of the m columns each are provided with a transfer electrode that is independent of those of other vertical last stages of them columns so that an operation of transferring signal charges from the vertical last stages concerned to the horizontal transfer part is controlled independently of said other vertical last stages, the integer m is 2n+1 (n denotes an integer of 1 or higher), and signal charges of pixels included in each of first and second pixel mixture groups are added together in the horizontal transfer part, where the first pixel mixture groups each are composed of 2n+1 (n denotes an integer of 1 or higher) pixels arranged at even other pixel in a horizontal direction of the bidimensionally arranged pixels, and the second pixel mixture groups each are composed of 2n+1 pixels that are arranged at every other pixel and are pixels other than those of the first pixel mixture groups in the horizontal direction of the bidimensionally arranged pixels, with centers of gravity of the pixels of the respective second pixel mixture groups each being located at an equal distance from centers of gravity of the pixels of two first pixel mixture groups adjacent thereto, and wherein each stage of the vertical transfer parts is formed with more than four transfer electrodes, and in transfer stages other than the vertical last stage of each of the vertical transfer parts, the transfer electrodes located even numbered from a side of the horizontal transfer part each are formed of an electrode film of a first layer, as an electrode common to all columns, and the transfer electrodes located odd numbered from the side of the horizontal transfer part each are formed of an electrode film of a second layer as an electrode common to all the columns, the second layer being an upper layer formed above the first layer, and in the respective vertical last stages, the electrodes located second and fourth from the side of the horizontal transfer part each are formed, as an independent electrode, of an electrode film identical to that of the second layer that is divided into insular parts located corresponding to the respective columns.

8. A solid-state image sensing device comprising:

vertical transfer parts provided corresponding to respective columns of bidimensionally arranged pixels to vertically transfer signal charges read out from the pixels; and a horizontal transfer part for horizontally transferring the signal charges received from the vertical transfer parts, wherein the vertical transfer parts include transfer stages, those located closest to the horizontal transfer part being vertical last stages, and the vertical last stages have transfer electrodes formed to have identical configurations repeated every in (m denotes an integer of 2 or higher) columns, vertical last stages of columns other than one of them columns or all vertical last stages of them columns each are provided with a transfer electrode that is independent of those of other vertical last stages of the m columns so that an operation of transferring signal charges from the vertical last stages concerned to the horizontal transfer part is controlled independently of said other vertical last stages, the integer m is 2n+1 (n denotes an integer of 1 or higher), and signal charges of pixels included in each of first and second pixel mixture groups are added together in the horizontal transfer part, where the first pixel mixture groups each are composed of 2n+1 (n denotes an integer of 1 or higher) pixels arranged at every other pixel in a horizontal direction of the bidimensionally arranged pixels, and the second pixel mixture groups each are composed of 2n+1 pixels that are arranged at every other pixel and are pixels other than those of the first pixel mixture groups in the horizontal direction of the bidimensionally arranged pixels, with centers of gravity of the pixels of the respective second pixel mixture groups each being located at an equal distance from centers of gravity of the pixels of two first pixel mixture groups adjacent thereto, and wherein each stage of the vertical transfer parts is formed with more than four transfer electrodes, and in transfer stages other than the vertical last stage of each of the vertical transfer parts, the transfer electrodes located even numbered from a side of the horizontal transfer part each are formed of an electrode film of a first layer, as an electrode common to all columns, and the transfer electrodes located odd numbered from the side of the horizontal transfer part each are formed of an electrode film of a second layer as an electrode common to all columns, the second layer being an upper layer formed above the first layer, and in the respective vertical last stages, the electrodes located second, fourth and sixth from the side of the horizontal transfer part each are formed, as an independent electrode, of an electrode film identical to that of the second layer that is divided into insular parts located corresponding to the respective columns.

* * * * *